US006282962B1

(12) United States Patent  
Koch et al.

(10) Patent No.: US 6,282,962 B1
(45) Date of Patent: *Sep. 4, 2001

(54) HIGH RESOLUTION ULTRASONIC THICKNESS GAUGE

(75) Inventors: Frank J. Koch, Ogdensburg, NY (US); Leon C. Vandervalk, Prescott; David J. Beamish, Brockville, both of (CA)

(73) Assignee: DeFelsko Corporation, Ogdensburg, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/951,010

(22) Filed: Oct. 15, 1997

Related U.S. Application Data

(62) Division of application No. 08/127,529, filed on Sep. 28, 1993, now Pat. No. 5,723,791.

(51) Int. Cl.[7] .................................................. G01N 29/00
(52) U.S. Cl. ............................................. 73/602; 73/597
(58) Field of Search ........................... 73/602, 597, 599, 73/615, 620, 629

(56) References Cited

U.S. PATENT DOCUMENTS

| H1084 | 8/1992 | Bylenok et al. . |
| 3,427,866 | 2/1969 | Weighart . |
| 3,665,754 | 5/1972 | Krautkramer et al. . |
| 3,690,154 | 9/1972 | Wells et al. . |
| 3,724,262 | 4/1973 | Niklas . |

(List continued on next page.)

FOREIGN PATENT DOCUMENTS

| 22 26 172 B2 | 12/1973 | (DE) . |
| 1 402 495 | 8/1975 | (GB) . |
| 2143640A | 2/1985 | (GB) . |
| 2195181A | 3/1988 | (GB) . |
| 2207757A | 2/1989 | (GB) . |

(List continued on next page.)

OTHER PUBLICATIONS

Digital Process of Ultrasonic Data by Deconvolution; Eckart E. Hundt et al.; pp. 249–252; IEEE Transactions on Sonics and Ultrasonics, vol. SU–27, No. 5, Sep. 1980.

Resolution Enhancement of Ultrasonic B–Scan Images by Deconvolution; Wolfgang Vollmann; pp. 78–83; IEEE Transactions on Sonics and Ultrasonics vol. SU–29, No. 2, Mar. 1982.

(List continued on next page.)

Primary Examiner—Hezron Williams
Assistant Examiner—Nashmiya Fayyaz
(74) Attorney, Agent, or Firm—Burns, Doane, Swecker & Mathis, L.L.P.

(57) ABSTRACT

A gauge for determining a thickness of a coating on a substrate includes a transducer for emitting ultrasonic signals into the coating and for generating electrical signals proportional to the ultrasonic signals received by the transducer, the received signals include first signals reflected from a transducer/coating interface and second signals reflected from a coating/substrate interface; a pulser for sending pulses to the transducer to trigger the emission of the ultrasonic signals; a sampler for sampling the electrical transducer signals and generating sampled data; a timer for controlling the pulser and the sampler so as to perform an equivalent time sampling of the signals received by the sampler; and a controller for calculating a thickness of the coating based on the sampled data, the controller includes the ability to subject the sampled data to a deconvolution analysis so as to distinguish sampled data corresponding to the first signals from sampled data corresponding to the second signals when the coating is thinner than a wavelength of the ultrasonic signal emitted by the transducer.

17 Claims, 21 Drawing Sheets

U.S. PATENT DOCUMENTS

| | | |
|---|---|---|
| 3,746,121 | 7/1973 | Niklas . |
| 3,774,444 | 11/1973 | Kent . |
| 3,901,071 | 8/1975 | Hansen . |
| 3,968,680 | 7/1976 | Vopilkin et al. . |
| 4,056,970 | 11/1977 | Sollish . |
| 4,070,917 | 1/1978 | Niklas et al. . |
| 4,117,732 | 10/1978 | Brazhnikov . |
| 4,173,897 | 11/1979 | Förstermann et al. . |
| 4,196,607 | 4/1980 | Youtsey et al. . |
| 4,221,132 | 9/1980 | Poole . |
| 4,261,367 | 4/1981 | Freese . |
| 4,364,273 | 12/1982 | Redding . |
| 4,438,404 | 3/1984 | Philipp . |
| 4,492,118 | 1/1985 | Bäthmann et al. . |
| 4,570,486 | 2/1986 | Volkmann . |
| 4,643,235 | 2/1987 | Schmoede et al. . |
| 4,654,584 | 3/1987 | Gyles . |
| 4,658,648 | 4/1987 | Roddeck et al. . |
| 4,669,310 | 6/1987 | Lester . |
| 4,685,075 | 8/1987 | Morita et al. . |
| 4,715,008 | 12/1987 | Jones . |
| 4,764,945 | 8/1988 | Tadahiro . |
| 4,817,615 | 4/1989 | Fukukita et al. . |
| 4,818,930 | 4/1989 | Flemming et al. . |
| 4,821,574 | 4/1989 | Takamizawa . |
| 4,823,590 | 4/1989 | Kniest et al. . |
| 4,823,801 | 4/1989 | Sakane . |
| 4,838,086 | 6/1989 | Bender et al. . |
| 4,840,066 | 6/1989 | Botsco et al. . |
| 4,878,114 | 10/1989 | Huynh et al. . |
| 4,899,589 | 2/1990 | Thompson et al. . |
| 4,904,954 | 2/1990 | Otake et al. . |
| 4,913,157 * | 4/1990 | Pratt, Jr. et al. .................. 73/597 |
| 4,930,511 | 6/1990 | Rossman et al. . |
| 4,955,225 | 9/1990 | Kniest et al. . |
| 4,971,061 | 11/1990 | Kageyama et al. . |
| 4,984,567 | 1/1991 | Kageyama et al. . |
| 5,021,666 | 6/1991 | Reber . |
| 5,038,615 | 8/1991 | Trulson et al. . |
| 5,092,176 | 3/1992 | Buttram et al. . |
| 5,113,358 | 5/1992 | Reber . |
| 5,150,714 | 9/1992 | Green . |
| 5,184,516 | 2/1993 | Blazic et al. . |
| 5,197,019 * | 3/1993 | Delon-Martin et al. .............. 73/602 |
| 5,293,871 * | 3/1994 | Reinstein et al. ............. 128/660.06 |
| 5,305,239 * | 4/1994 | Kinra ..................................... 73/602 |
| 5,513,531 * | 5/1996 | Sapia et al. ............................ 73/602 |

FOREIGN PATENT DOCUMENTS

| | | |
|---|---|---|
| 78344 | 5/1985 | (JP) . |
| 60-104253 | 6/1985 | (JP) . |
| 228307 | 10/1986 | (JP) . |
| 63-33457 | 3/1988 | (JP) . |
| 4-40309 | 2/1992 | (JP) . |
| 4-125484 | 4/1992 | (JP) . |
| 4-310886 | 11/1992 | (JP) . |
| 5-26655 | 2/1993 | (JP) . |
| WO 87/04783 | 8/1987 | (WO) . |
| WO 89/01130 | 2/1989 | (WO) . |

OTHER PUBLICATIONS

A Simple Method of Realizing the Deconvolution of Ultrasonic Images; W. Köhl et al.; pp. 273–278; Ultrasonics, Nov. 1981.

Ultrasonic Imaging; G Demoment et al.; pp. 435–451; vol. 6, No. 4, Oct. 1984.

Algorithm for on Line Deconvolution; Alain Herment et al; pp. 325–345; (1982).

"The Application Of Digital Signal Processing And Pattern Recognition To Ultrasonic And Electromagnetic Nondestructive Testing And Evaluation", Singh et al, Feb. 1991.

"Signal Processing And Data Aquisition Techniques For The Ultrasonic Nondestructive Evaluation Of Aerospace Materials", McRae et al, *Canadian Aeronautics And Space Journal*, vol. 38, No. 1, Mar. 1992.

"Principles And Method Of Ultrasonic Characterization Of Materials", Mahesh Bhardwaj, *Advanced Ceramic Materials*, vol. 1, No. 4, 1986.

"Ultrasonic Measurement Of Paint And Organic Coatings On Plastics And Composites", John Brunk, 1987.

"Thickness Of Paint On Plastic And Composites", No. 19, Rev. '90/A.

"Ultrasonic Measurement Of Thickness Of Paint On Plastic", Thomas Nelligan, *Materials Evaluation*, vol. 48, Jul. 1990.

PosiTector 6000 Series brochure and instruction manual.

C–Scan, SPUD Signal Processing for Ultrasonic Detection brochure, 1990.

C–Scan, Digital Ultrasonic Inspection System brochure.

Panametrics, Inc., Ultrasonic Thickness Gages And Their Applications brochure.

StressTel Utrasonic Testing Equipment, TM1D Operation Manual.

StressTel Ultrasonic Testing Equipment, T–Mike EZ Operation Manual, 1990.

"Digital Signal Processing Techniques For Improved Temporal Resolution Of Ultrasonic Signals", S.M. Kramer, Jul. 17, 1987.

Analog Devices 125 MSPS Monolithic Sampling Amplifier brochure.

* cited by examiner

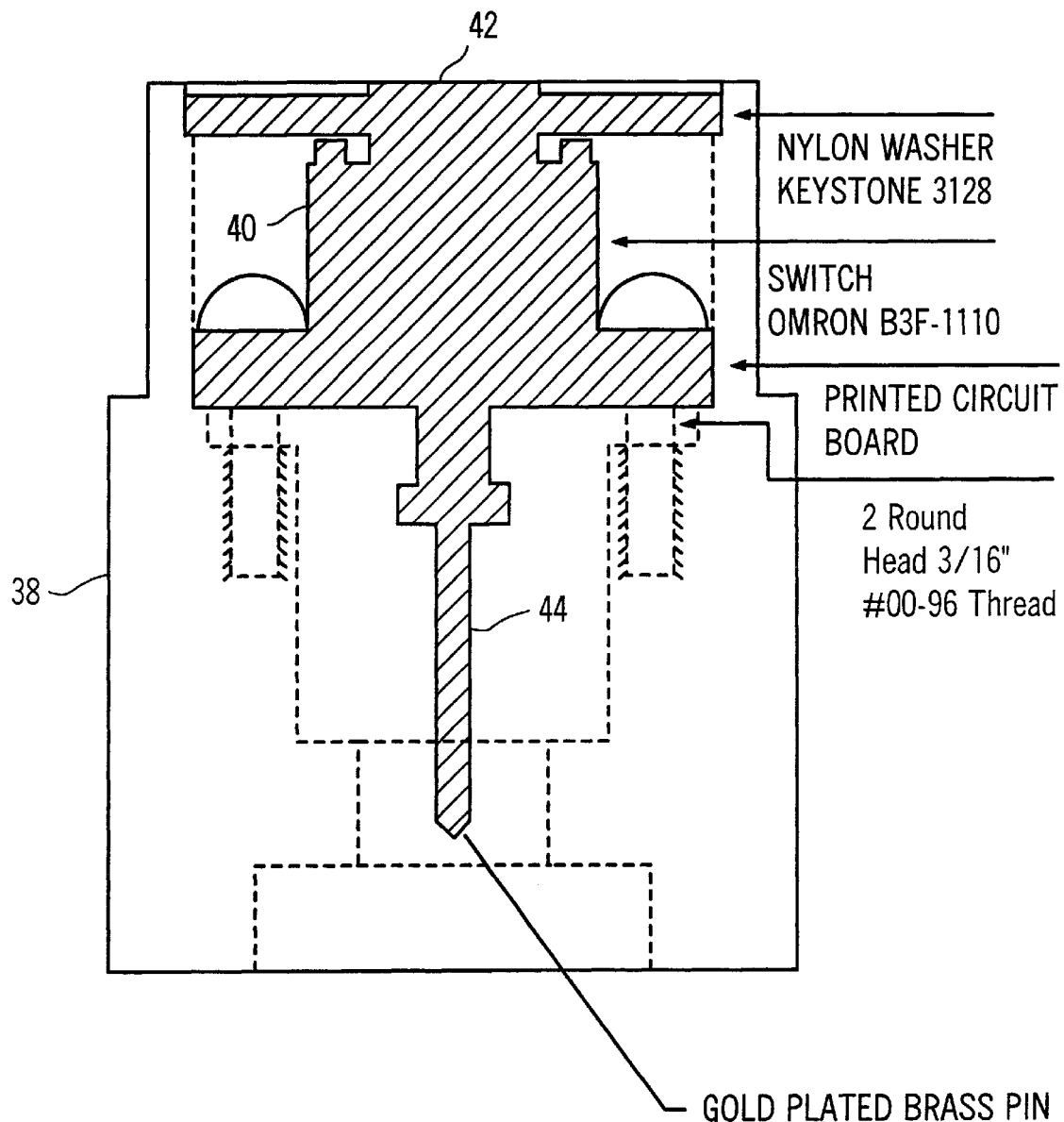

$i_j$ The incident wavelet $h_j$ Time domain reflection characteristics of coating/substrate $o_j$ The reflection wavelet is the convolution of $i_j$ and $h_j$ TIME DOMAIN REFLECTION CHARACTER in microseconds

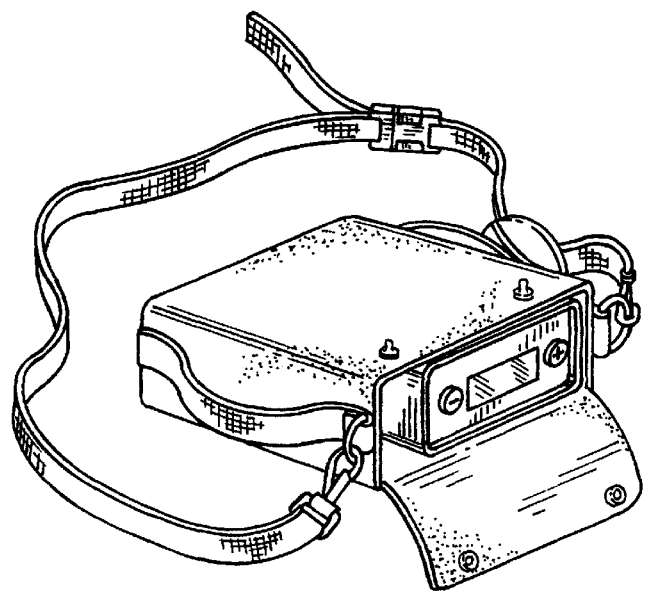
FIG. 25
FIG. 26
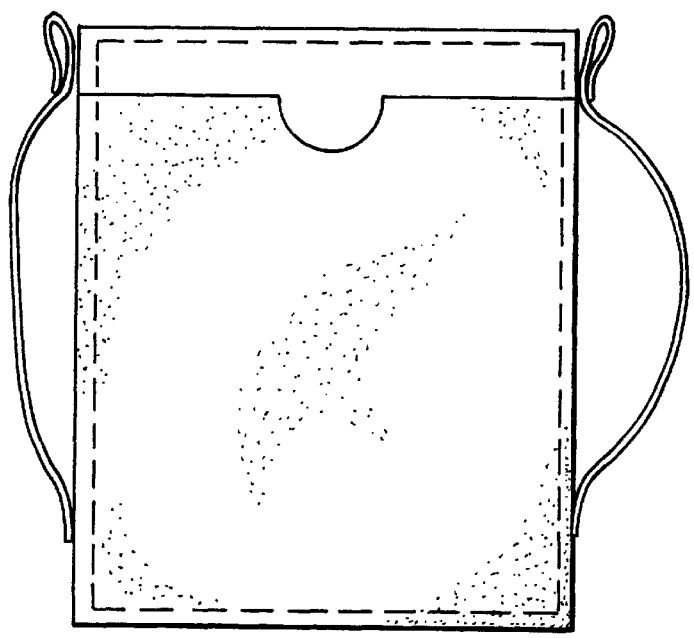

HIGH RESOLUTION ULTRASONIC THICKNESS GAUGE

This application is a divisional of application Ser. No. 08/127,529, filed Sep. 28, 1993 now U.S. Pat. No. 5,723,791.

BACKGROUND OF THE INVENTION

1. Field of the Invention

The present invention relates to gauges, and in particular to thickness gauges that are capable of determining the thickness of a coating on a substrate, regardless of the composition of the substrate and coating.

2. Discussion of related art

Ultrasound provides an ideal physical mechanism to investigate the thickness of coatings on substrata with acoustically different properties. When a coating is applied to a substrate that has acoustic properties that are different from those of the coating, an acoustic coating/substrate interface is created. At such an interface, an ultrasonic vibration will be partially reflected.

For example, an ultrasonic vibration, also known as an impulse, can be transmitted into a coating using a resonant piezo element transducer. The same transducer can also be setup to "listen" for echoes created when the impulse reflects from the interface of the coating and substrate back to the transducer. The output of the transducer can be recorded for a known period after the impulse has been transmitted. This period is defined as an echo window. The echo window is defined to overlap with the time of expected echoes of interest.

By analyzing the echo recorded during the echo window, it is possible to determine the location of the interface between the coating and the substrate. The thickness of the coating can be determined if the velocity of sound within the coating material and the time of the interface echo are known. In other words, the thickness of the coating can be determined by multiplying the velocity of the vibration through the coating material times the time for the vibration to enter the coating, reflect off the interface, and exit the coating, and dividing that product by two.

Thickness=(Velocity×Time)/2

The resolution of the derived thickness is limited by the temporal resolution of the sampled echo. Improvements in the resolution of the sampled echo will directly improve the resolution of the derived thickness.

Ultrasonic coating thickness gauges used to measure coatings on nonferrous, nonconductive substrata have existed for some time. The gauges fall into three broad categories: Real Time Echo Analyzers, Real Time Echo Capture/Digital Analyzers, and Analog/Digital Hybrid Flaw Analyzers. A brief description of each of the types of gauges follows:

1. Real Time Echo Analysers

Real time echo analysis refers to gauges that produce ultrasonic impulses and attempt to analyze the resulting echoes in real-time. Ultrasonic thickness gauges designed to measure wall thickness typically use a gated threshold detector to enable a measuring circuit during the period of transducer/material echo and material/air echo (back echo). The measuring circuit typically is required to resolve to a resolution of 10 nsec or better. For example, to resolve to a resolution of 0.001 inch in STEEL 410 would require a resolution of:

(1 mils/291 mils/µs)*2(round trip)=6.87 nsec.

Typically, wall thickness gauges of this type derive an average based on a large number of period (transducer/material echo to material/air echo) measurements. Some gauges retrigger the pulser upon the detection of back echoes. A predetermined number of retrigger cycles are allowed to occur while a timer determines the length of time for the predetermined number of cycles to occur. By increasing the number of retrigger cycles it is possible to achieve very good resolution.

Methods to precisely measure the delay time between the transducer/coating echo and coating/substrate echo exist. U.S. Pat. No. 4,685,075 "APPARATUS FOR MEASURING PROPAGATION TIME OF ULTRASONIC WAVES" and U.S. Pat. No. 4,838,086 "METHOD FOR MEASURING THE WALL THICKNESS OF A WORKPIECE BY ULTRA-SOUND" illustrate several techniques for resolving the delay between multiple echoes. This style of gauge requires "crisp echoes" from both surfaces. This type of gauge provides inconsistent results when measuring coatings on substrata that have acoustic properties that are similar to those of the coatings.

To help overcome this problem most gauges of this type utilize a variable threshold detector that is ramped down during the echo period, For Example, while the ultrasonic vibration is transmitted into the material, the threshold is maintained at a level that will not allow the detector to trigger. As the ultrasonic vibration propagates through the coating the threshold level is decreased. In this way the gauge will be less susceptible to transducer ring from the transducer/material echo and can compensate to coating attenuation of the vibration. However, this problem has not been adequately addressed, particularly when thin coatings are being measured. Most ultrasonic gauges of this type, although well suited for particular applications, lack the flexibility to be adapted for multiple applications.

2. Real Time Echo Capture/Digital Analysis

To overcome some of the drawbacks associated with real time echo analysis, real time echo capture gauges are used to digitize the echo waveform. Typically, this type of instrument incorporates a very high speed A/D converter to digitize the echo waveform in real time. For example, to resolve to a resolution of 0.001 inch in STEEL 410 would require a resolution of 6.87 nsec. The A/D converter required must be capable of sampling the waveform at this resolution.

Typically, gauges that use these techniques are confined to lab use where high speed sampling scopes and digital computers can be employed to digitize and analyze the resulting echo waveforms.

3. Analog/Digital Hybrid Flaw Analysers

Flaw analyzers typically provide mechanisms to generate, amplify, and display the echo waveform of an ultrasonic inspection. Such instruments are very useful in the investigation of subsurface flaws in metal structures. Flaws such as subsurface cracks or voids can be imaged very accurately. For example, welding flaws and corrosion on the inside diameter of a pipe used to carry toxic materials can be imaged with analog/digital hybrid flaw analyzers.

Such instruments, although very useful, require the operator to understand/interpret the results. The operation of such equipment for coating thickness gauging requires the operator to distinguish from the echo window the interface echo of interest. Once the echo of interest has been found, a scale can be used to directly measure distance based on the velocity of sound in the material.

SUMMARY AND OBJECT

The present invention relates to a handheld portable platform from which ultrasonic investigations can be done. The present invention provides the mechanisms required to excite a piezo element ultrasonic transducer, amplify the echo waveform detected by the transducer, sample in equivalent time the echo waveform, digitize the echo waveform, process the waveform, calculate unknown properties of the sample under investigation and display these properties to an operator.

Specifically, an embodiment of the present invention relates to measuring the thickness of a coating applied to an acoustically different substrate. The present invention can also be used to quantify other properties of the material under investigation. A measure of substrate roughness could be effected by analyzing the echo waveform. Coating properties such as hardness, surface roughness, and coating adhesion can all be determined by appropriate analysis of the echo waveform.

An embodiment of the present invention incorporates a unique high speed sampling system that uses an equivalent time sampling process to reconstruct the echo waveform from a piezo transducer. To increase the temporal resolution of the sampled waveform a curve fitting function can be performed on the sampled data. The curve fitting function uses as input the sampled data at the equivalent sample time. The fitted function is sampled in software at a decreased sample period. The resulting sampled waveform represents the fitted original waveform with increased temporal resolution. To effect high resolution coating thickness measures on coatings that are thinner than the ultrasound wavelength used to investigate the coating, deconvolution techniques may be employed.

A comparison of the present invention to the prior art will illustrate the advantages of obtaining a high resolution sampled representation of the echo waveform and calculating the coating thickness as compared to using dedicated hardware approaches.

An embodiment of the present invention does not provide a mechanism to directly display the echo window. The operator instructs the gauge of the type of coating and of the type of substrate. The gauge then configures the instrumentation to best investigate such a coating/substrate combination. Using numerical techniques a measure of the coating thickness is effected from analysis of the digitized echo waveform. The present invention may also be utilized when the type of coating or substrate is unknown.

For experienced ultrasonic inspectors the present invention may seem inappropriate, but to the inspector interested in measuring coating thickness, such an instrument provides the benefit of combining a built in knowledge base with the ability to be adapted to a large number of inspection situations.

The present invention can be coupled to a remote host computer (PC). The gauge can be instructed to transmit the digitized echo waveform to be displayed on the host computer's output device. In this way, analysis and storage can be done in the lab using echo waveforms digitized remotely in the field. The present invention provides the inspector with a unique "handheld" portable tool to easily generate and digitize ultrasonic echo waveforms, store the waveforms, and later display, analyze and archive the results.

The present invention digitizes the echo waveform. By applying different numerical techniques depending upon certain echo signatures it is possible to adapt the analysis process based on the type of inspection being performed. The present invention provides the mechanisms to perform such adaptive techniques.

The present invention utilizes a unique sampling system ideally suited for handheld portable applications. The sampling system is capable of reconstructing the echo waveform to a resolution less than 5 nsec while requiring relatively small area and electrical power requirements.

Using state of the art electronic components, it is possible to construct an apparatus to generate, amplify, sample, digitize, and analyze an ultrasonic echo. The present invention discloses such an apparatus.

Accordingly, the present invention includes a thickness gauge having an ultrasonic transducer; a pulser for sending pulses to the transducer; a sampler for sampling signals from the transducer; a timer for controlling the pulser and the sampler so as to perform an equivalent time sampling of the signals received by the sampler; and a controller for calculating a thickness of a first material based on said sampled signals.

Another embodiment includes a gauge for determining a thickness of a coating on a substrate, wherein the gauge has a transducer for emitting and receiving ultrasonic signals into the coating and for generating electrical transducer signals proportional to the ultrasonic vibration signals received by said transducer, the received signals include first signals reflected from a transducer/coating interface and second signals reflected from a coating/substrate interface; a pulser for sending pulses to the transducer to trigger the emission of said ultrasonic signals; a sampler for sampling the electrical transducer signals and generating sampled data; a timer for controlling the pulser and the sample so as to perform an equivalent time sampling of the signals received by the sampler; and a controller for calculating a thickness of the coating based on said sampled data, said controller having the ability to subject said sampled data to a deconvolution analysis so as to distinguish sampled data corresponding to the first signals from sampled data corresponding to said second signals when the coating is thinner than a wavelength of the ultrasonic signal emitted by the transducer.

BRIEF DESCRIPTION OF THE DRAWINGS

FIGS. 4a, 4b, and 5 are views of a transducer and transducer housing;

FIGS. 25 and 26 represent additional views of the gauge according to the present invention.

DETAILED DESCRIPTION OF PREFERRED EMBODIMENTS

Figure 1:
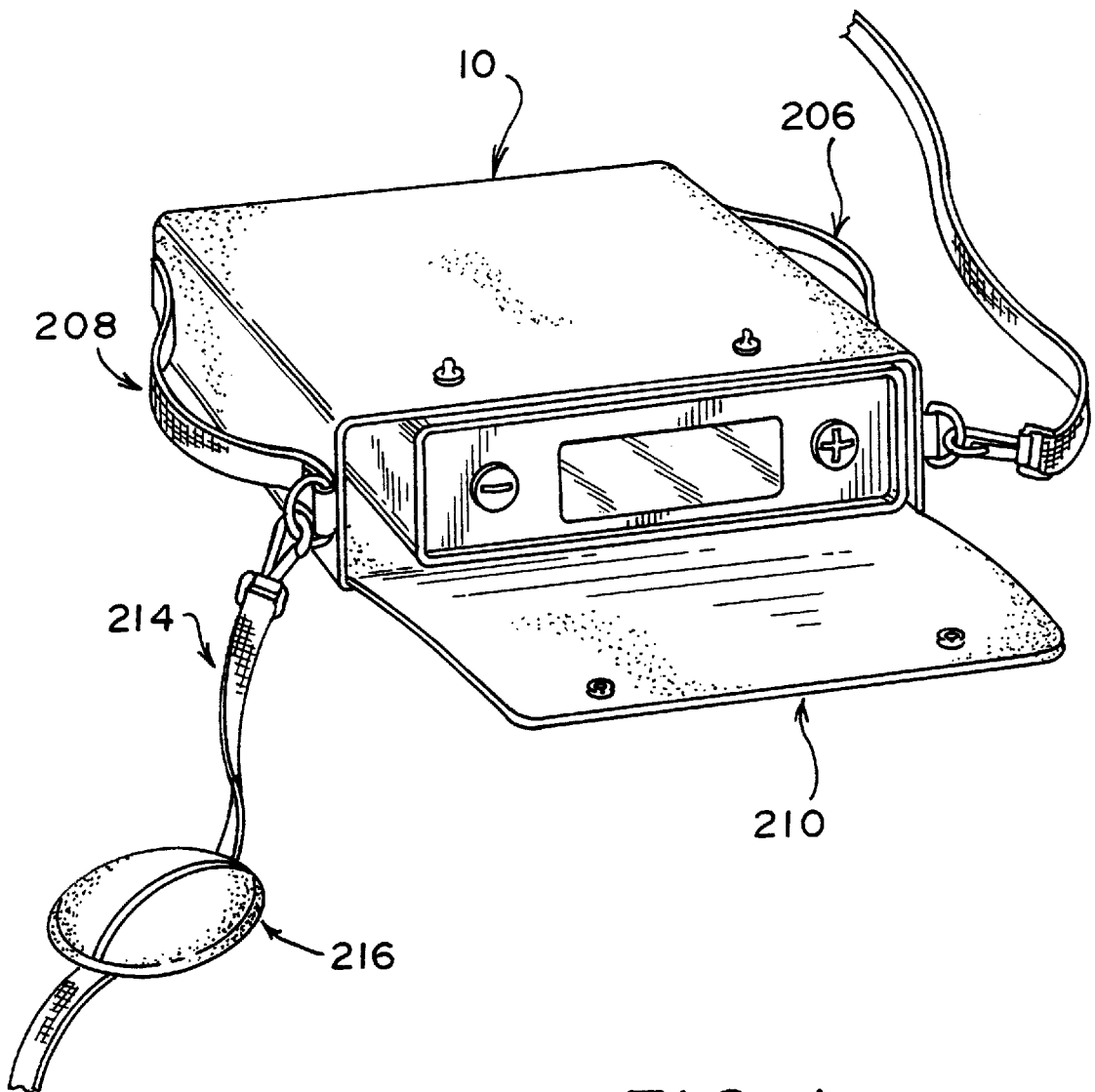
FIG. 1 is a perspective view of a gauge according to the present invention.
Figure 22:
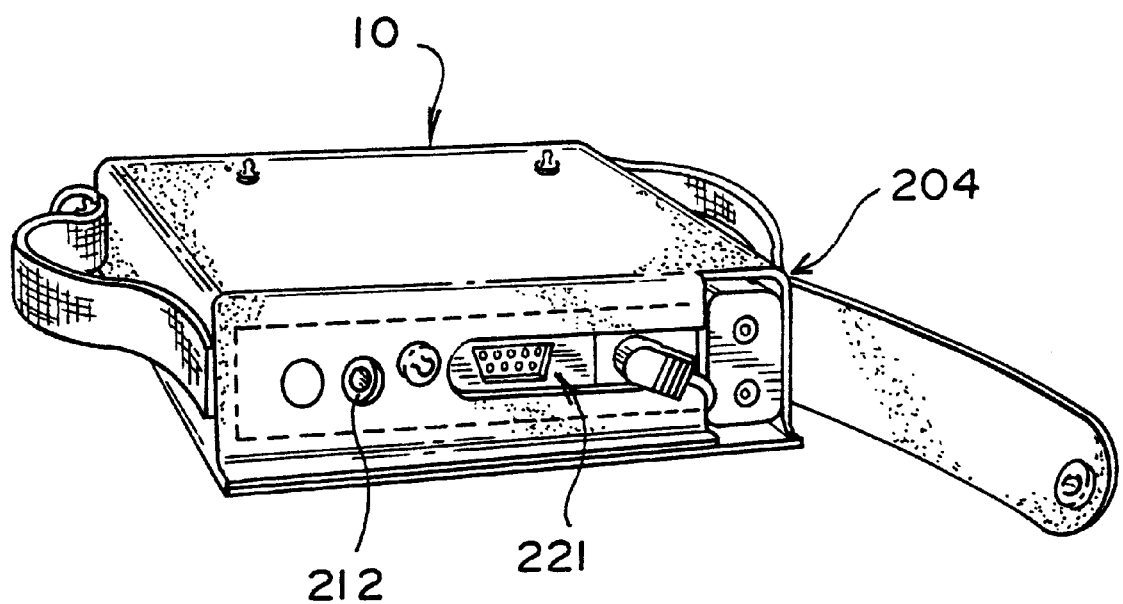
FIG. 22 illustrates the rear panel of the present invention.

The present invention relates to a gauge for measuring the thickness of coatings on substrata, including nonferrous, nonconductive substrata, such as concrete. It can also be used to measure the thickness of a wall, the roughness of a surface, or other physical properties that affect the reflection of ultrasonic signals. In FIGS. 1 and 22, a hand held gauge 10 according to the present invention is illustrated.

The gauge 10 of the present invention preferably operates on an equivalent time sampling system coupled with numerical techniques to improve the temporal resolution of sampled data. The present invention includes a unique high resolution sampling system that is preferably capable of acquiring a digital representation of an ultrasonic echo waveform obtained from an excited piezo element transducer.

Figure 2:
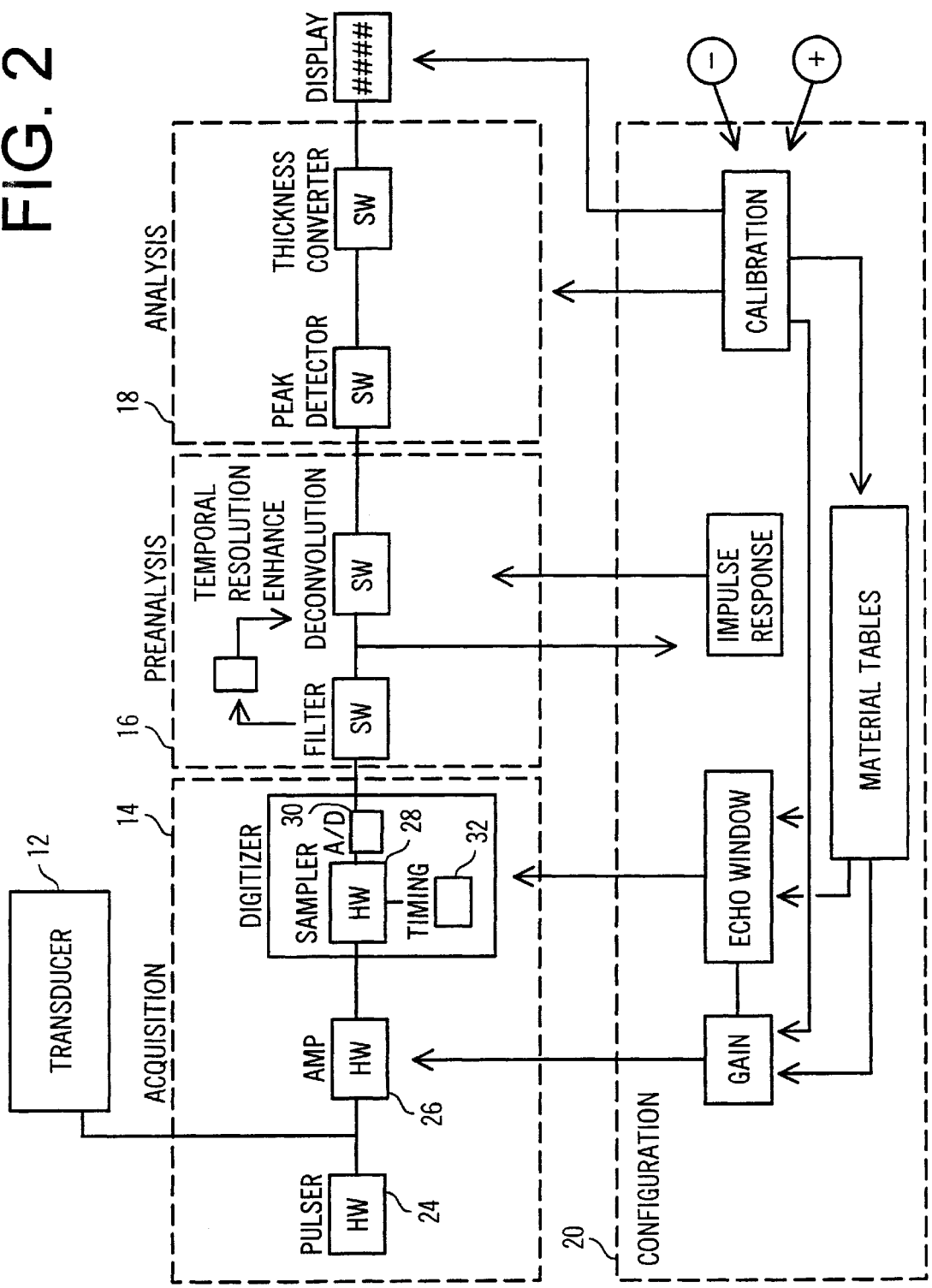
FIG. 2 is a functional diagram of the present invention.

FIG. 2 represents a functional diagram of a system according to the present invention. As seen in FIG. 2, the gauge 10 can be divided into five functional subsystems: the transducer 12, the acquisition subsystem 14, the preanalysis subsystem 16, the analysis subsystem 18, and the configuration subsystem 20. In FIG. 2, the terms SW and HW are used to indicate whether the function is performed by software (SW) or hardware (HW). An eight bit microprocessor (FIG. 3, item 22) interconnects and controls the various components of the system.

Figure 3:
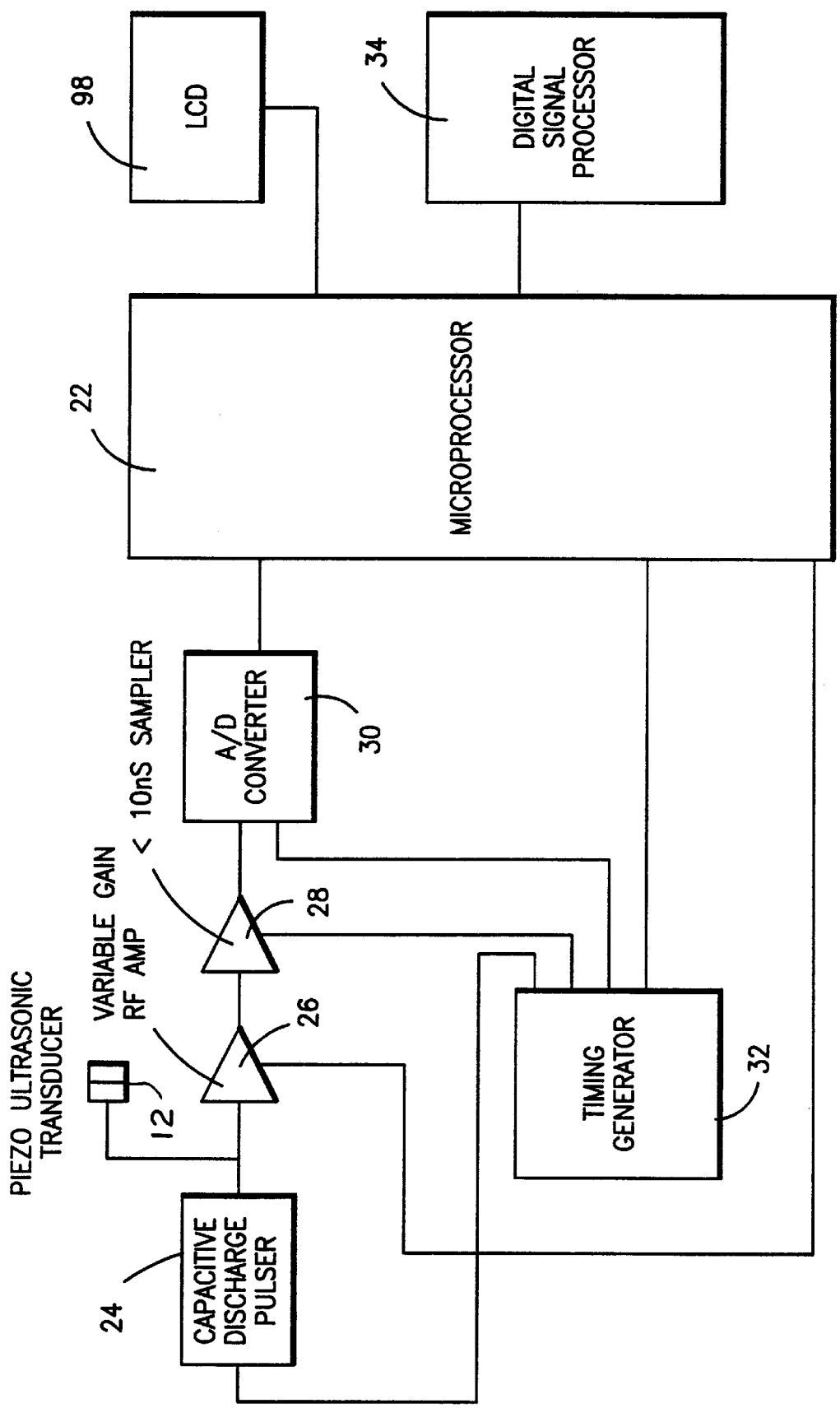
FIG. 3 is a block diagram of a circuit used in a gauge according to the present invention.

FIG. 3 represents a block diagram of the high resolution sampling system for an ultrasonic echo digitizer according to the present invention. The system includes a variable voltage capacitive discharge style pulser 24, the ultrasonic transducer 12, a variable gain RF amplifier 26, a high speed sampler 28, an analog to digital converter 30, and a precision timing control circuit 32. The operation of the sampling system is controlled by the microprocessor 22. A high speed DSP (digital signal processor) 34 is interfaced to the microprocessor 22 to perform numerically intensive calculations.

In operation, the pulser 24 is triggered repeatedly to excite the transducer 12 in rapid succession. The transducer 12 is preferably an ultrasound transducer. A very high speed sampling circuit is triggered to sample at a progressively longer delay with respect to each time the pulser 24 excites the transducer 12. The pulser 24 is thus triggered many times while progressively adjusting the delay time for the sampler. In other words, in one reading, the pulser 24 may be triggered 1024 times. At the first trigger, a reading is sampled at time X after the trigger. At the second trigger, a reading is sampled at time (X+a fixed period of time, e.g., 2 nsec.) after the second trigger. The third reading is sampled at (X+(2* the fixed period of time)), etc. Thus, a series of measurements is taken, wherein each measurement is taken at a predetermined period of time after the previous trigger. The temporal resolution of the overall reading can be determined by the length of the fixed period of time known as the sample time.

The analog to digital converter 30 is used to digitize the sampled echo waveform. The echo waveform is thus progressively reconstructed. The difference in delay time between a sampling and the previous sampling represents the sample period of the reconstructed waveform. The sample window for the echo waveform can be controlled by changing the number of pulse/echo/sample operations or the sample time. This type of sampling is referred to herein as "equivalent time sampling". An advantage of an equivalent time sample process is that control of the gain of the RF amplifier 26 becomes very simple.

Implementing a gain vs. delay function allows the gauge 10 to compensate for acoustic attenuation in the coating material being investigated. The digitized echo waveform can be analyzed and the location of the boundary region can be mathematically derived. This invention addresses the mechanics of digitizing an ultrasonic echo and the techniques required to digitize an echo using an equivalent time sampling system within the confines of a "handheld" portable instrument.

Each of the subsystems will be addressed in further detail below:

The Transducer

The transducer 12 comprises a piezo element 36 mounted within a housing 38. The piezo element 36 is positioned such that when it is excited by an electrical signal, the piezo element 36 will vibrate and produce an ultrasonic vibration that will propagate from the element into a coupling medium 37. In the preferred embodiment, the coupling medium 37 is polystyrene.

The transducer 12 is preferably a type that produces longitudinal ultrasonic vibrations. The preferred resonant frequency of the transducer 12 is 10 MHz. The coupling medium 37, also referred to as the delay line, is used to couple the ultrasonic vibrations from the piezo element 36 into the coating to be measured. A purpose of the delay line is to separate in time the excitation function produced from the pulser 24 from the reflection produced from a coating/substrate boundary.

Figure 4B:
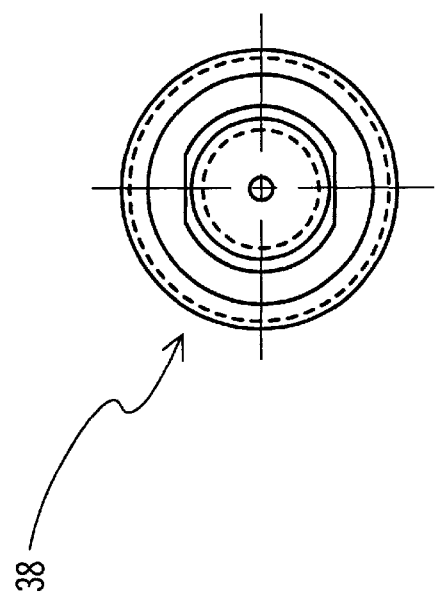
Figure 4A:
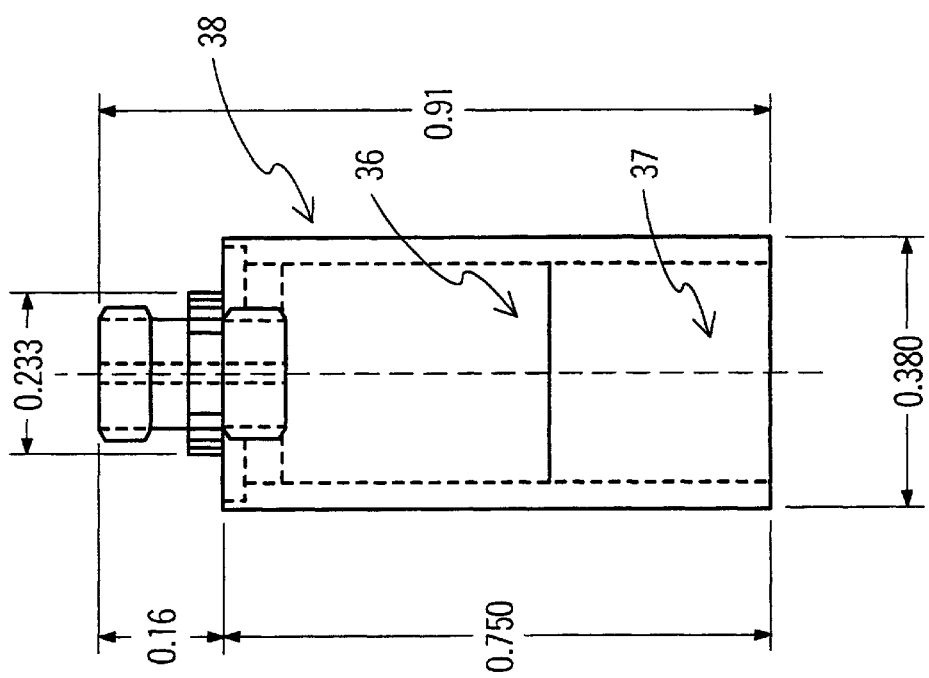

The housing 38 for the ultrasonic transducer 12 is illustrated in FIGS. 4a, 4b, and 5. A transducer switch 40 (FIG. 5) is incorporated within the housing 38 and includes a button 42 located at some readily accessible location, such as an end of the housing 38. The button 42 is mechanically connected to switch 40 such that when button 42 is depressed, switch 40 is closed. A pin 44, preferably constructed of gold plated brass, is used to form a connection means, so that different transducers can be easily connected and disconnected to the housing 38.

Figure 12:
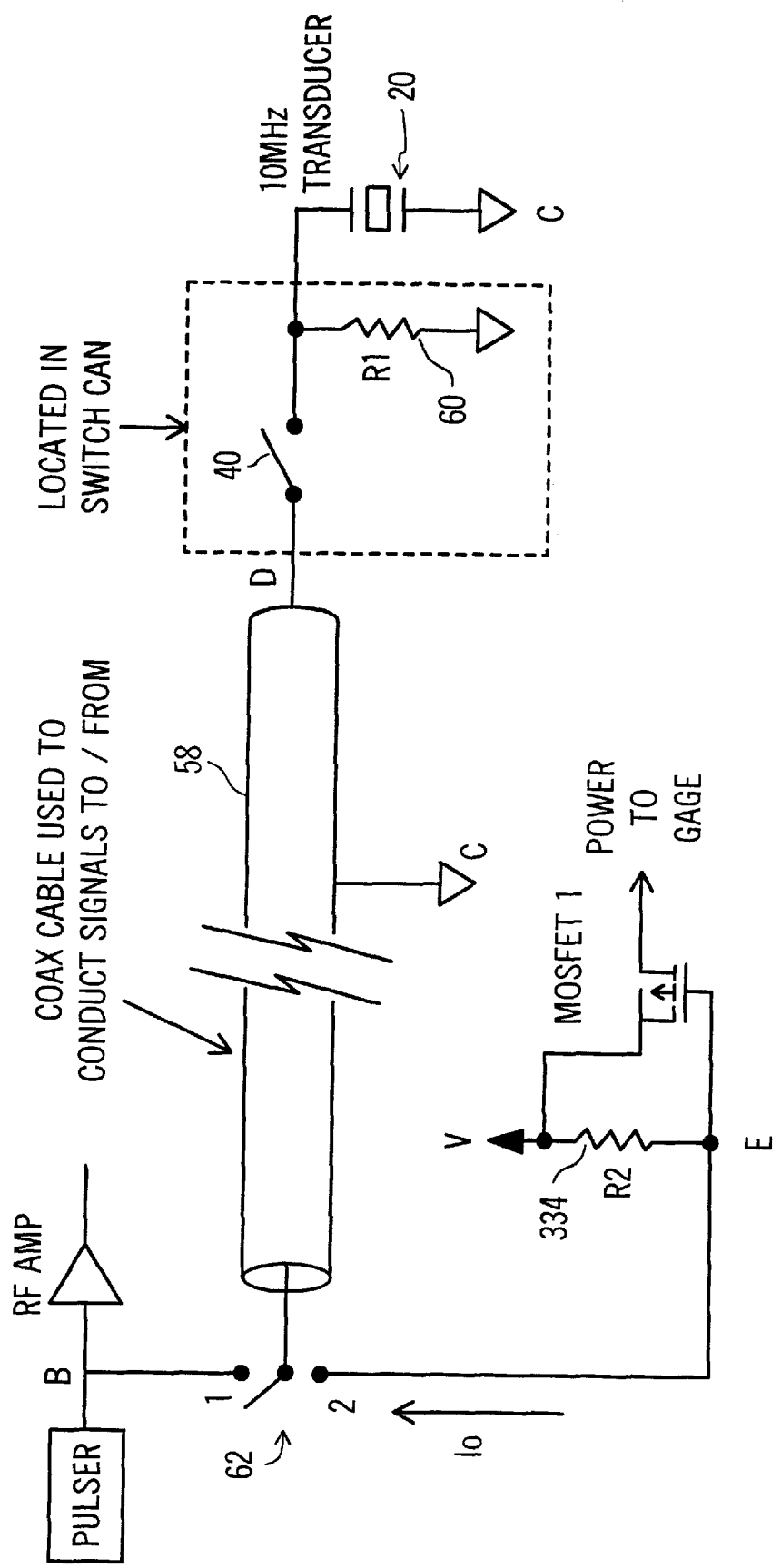
FIGS. 12–15 represent portions of circuits used in the present invention.

The transducer 12 is preferably wired to the transducer switch 40 as illustrated in FIG. 12. The transducer switch 40 is preferably wired to the body of the system using coaxial cable 58. As will be explained in further detail below, the entire gauge system can be powered on by activating the transducer switch 40 on the transducer housing 38. Being able to activate the gauge 10 by means of the switch 40 on the housing 38 enables the gauge itself to be carried by an operator by means of a strap, such as a shoulder strap, without having the gauge 10 necessarily be readily accessible to the operator. Having the switch 40 on the housing 38 thus enables simple one-handed operation of the gauge 10.

The switch 40 located in the transducer housing 38 is configured in series with the transducer 12 and the coaxial cable 58 interconnecting the transducer 12 to the system. A transducer resistor 60 is connected to the switch 40 in parallel with the transducer 12.

Figure 8:
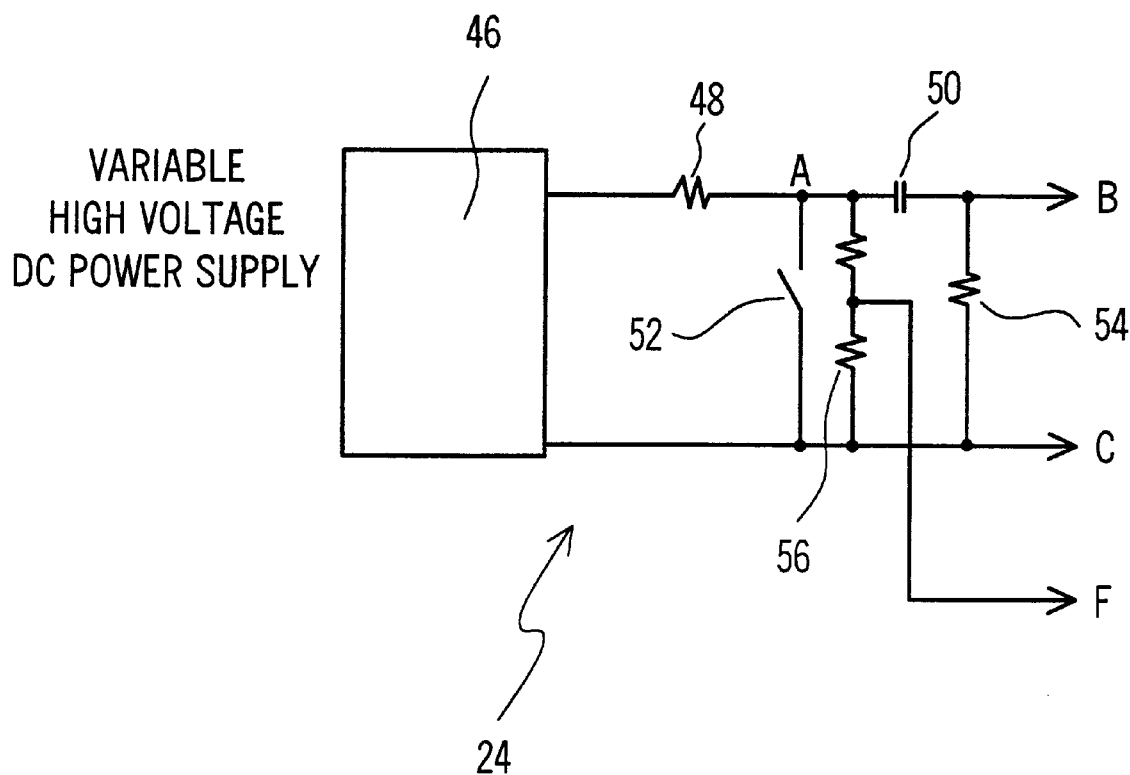
FIG. 8 is a schematic view of a pulser used in the present invention.

A control switch 62 is located within the main housing of the gauge and is configured so that in position 1, a circuit is formed from node B to node D. See FIG. 12. In position 1, the transducer 12 can be used to investigate a coating/ substrate. When the switch 40 is closed, a circuit is made between node D and node C. Nodes B and C on FIG. 8 are connected to nodes B and C on FIG. 12.

The transducer resistor 60 is selected to be of a sufficient value so as not to interfere with the signals to and from the transducer 12. The position of the control switch 62 is controlled by the microprocessor 22.

The system uses a FORM C1 relay to realize the control switch 62. Position 2 of the control switch 62 is used to connect nodes E and D. A resistor 334 is connected to node E such that when node E is connected to node D using the switch 62, and if the transducer switch 40 is closed, current will flow from a voltage source V through the resistor 334, the switch 62, the coax cable 58, the transducer switch 40, and the resistor 60 to complete a circuit.

The voltage at node E is monitored by the microprocessor 22. When the transducer switch 40 is open, no current can flow through the circuit formed by the resistor 334, the switch 62, the coax cable 58, the transducer switch 40, and the resistor 60. Thus, the voltage on node E will be +V.

When the transducer switch 40 is closed, current will flow in the circuit and the voltage at node E will be:

$$V_E = V - (R_{334} * V)/(R_{334} = R_{60})).$$

In this way, it is possible for the transducer switch 40 to control the operation of the system through the effective control of the switch 62 by the microprocessor 22. When the software needs to know the state of the transducer switch 40, the switch 62 is moved to position 2 and the voltage at node E is measured.

When the instrument is in the power off state, the state of the control switch 62 is in position 2. If node V is connected to the power source, then a P channel MOSFET could be used, as illustrated, to provide power to the instrument.

The Acquisition Subsystem

The acquisition subsystem 14 is used to generate an ultrasonic vibration and acquire a digital representation of the ultrasonic echo that is reflected from a coating/substrate boundary. Within the acquisition subsystem 14, the pulser 24 is used to generate an impulse function that is converted by the transducer 12 into an ultrasonic vibration that is propagated into the coating/substrate under investigation by the coupling medium 37.

The ultrasonic vibration will propagate through the coating until a boundary of different elastic properties is encountered. Such a boundary is formed at most coating/substrate interfaces. When the vibration encounters a boundary, an echo is produced that will propagate back to the transducer 12 if the incident angle of excitation is substantially perpendicular to the coating/substrate boundary. When the transducer 12 is vibrated, an electrical signal is produced that represents the vibration. That signal is amplified by the high frequency variable gain RF amplifier 26.

The intensity of the echo will dictate how much gain to apply to the RF amplifier 26. By knowing the material properties of the coating and the substrate, it is possible to derive a function that predicts the required gain vs delay for differing thickness of coatings on a substrate.

Figure 6:
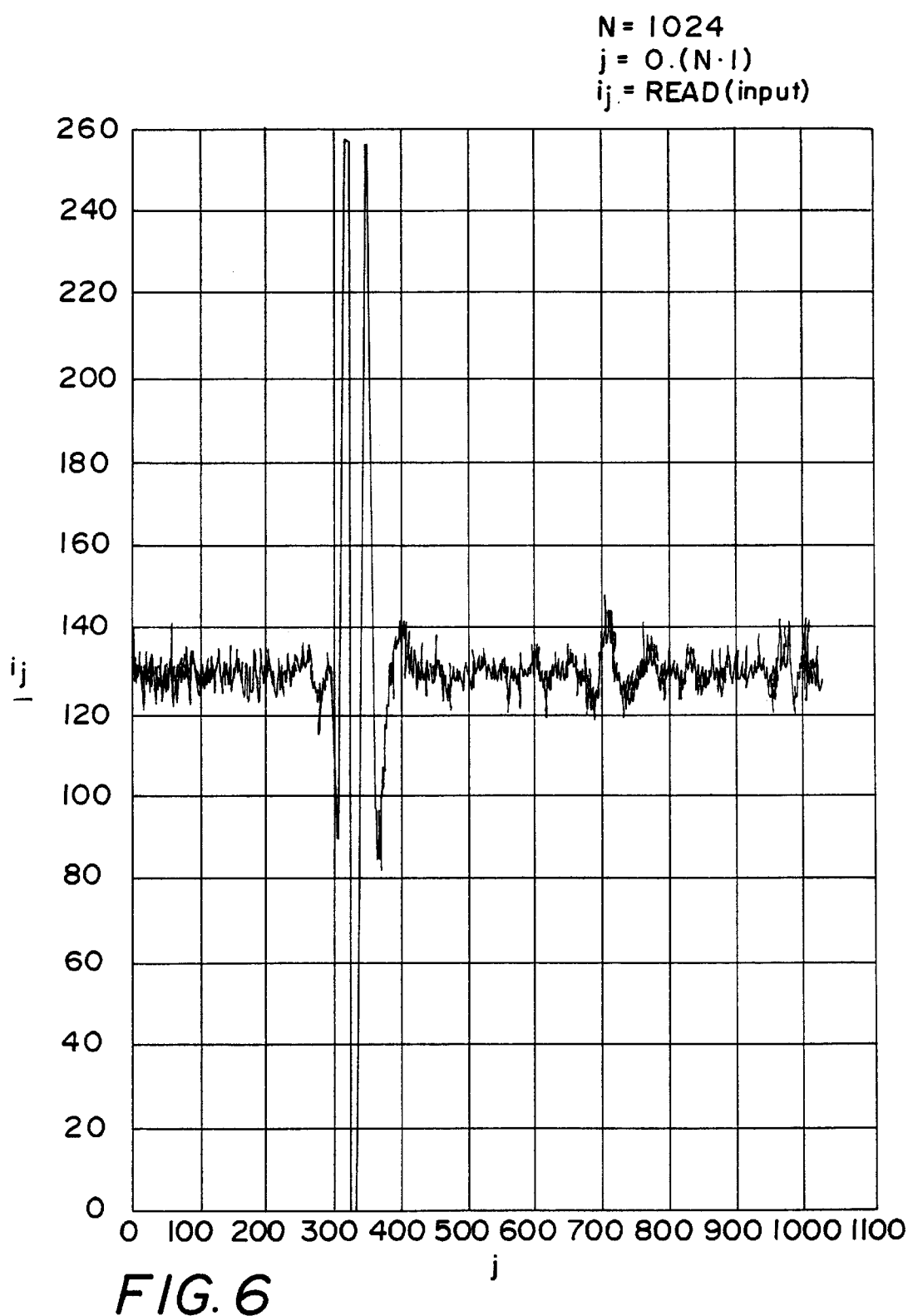
FIGS. 6 and 7 are examples of echo waveforms as digitized by the present invention.

During operation, a gain vs delay function is calculated and set, then the transducer 12 may be placed on the coating and an echo waveform is created and digitized. FIG. 6 illustrates a digitized echo waveform. As illustrated, 1024 samples have been digitized to a vertical resolution of 8 bits. The waveform is analyzed to determine if any samples of sufficient amplitude are located within the digitized waveform. Any vertical deflection +/−20 vertical units from the baseline (128 on the y axis FIG. 6) has been determined to be sufficient. If there are no samples within this range, the gain is adjusted iteratively, increasing or decreasing as needed, until an echo within the range is found. If a sample exceeds the range of the A/D converter, the A/D converter will saturate and indicate a maximum or minimum (#255 or #0 on the y axis of FIG. 6).

The sampler within the acquisition subsystem 14 uses an equivalent time sampling system that is built from three functional blocks: high speed sampler 28, timing generator 32, and A/D converter 30.

Turning attention to FIG. 8, the pulser 24 consists of a high voltage power supply 46, a charging resistor 48, a discharge capacitor 50, a discharge switch 52, a damping network 54, and a feedback network 56.

The capacitor 50 is charged through the resistor 48. When a predetermined voltage has accumulated across the capacitor 50, the discharge switch 52 is closed by an appropriate signal from the timing generator 32. The feedback network 56 is sampled by the microprocessor 22 at node F to determine when an appropriate voltage has developed at node A. When the discharge switch 52 is closed, the voltage across the capacitor 50 is discharged through the discharge switch 52. By instantaneously connecting node A with node C, node B will instantaneously be at a negative potential with respect to node C. Node B will slowly discharge until nodes A, B, & C are at essentially the same potential.

Figure 9:
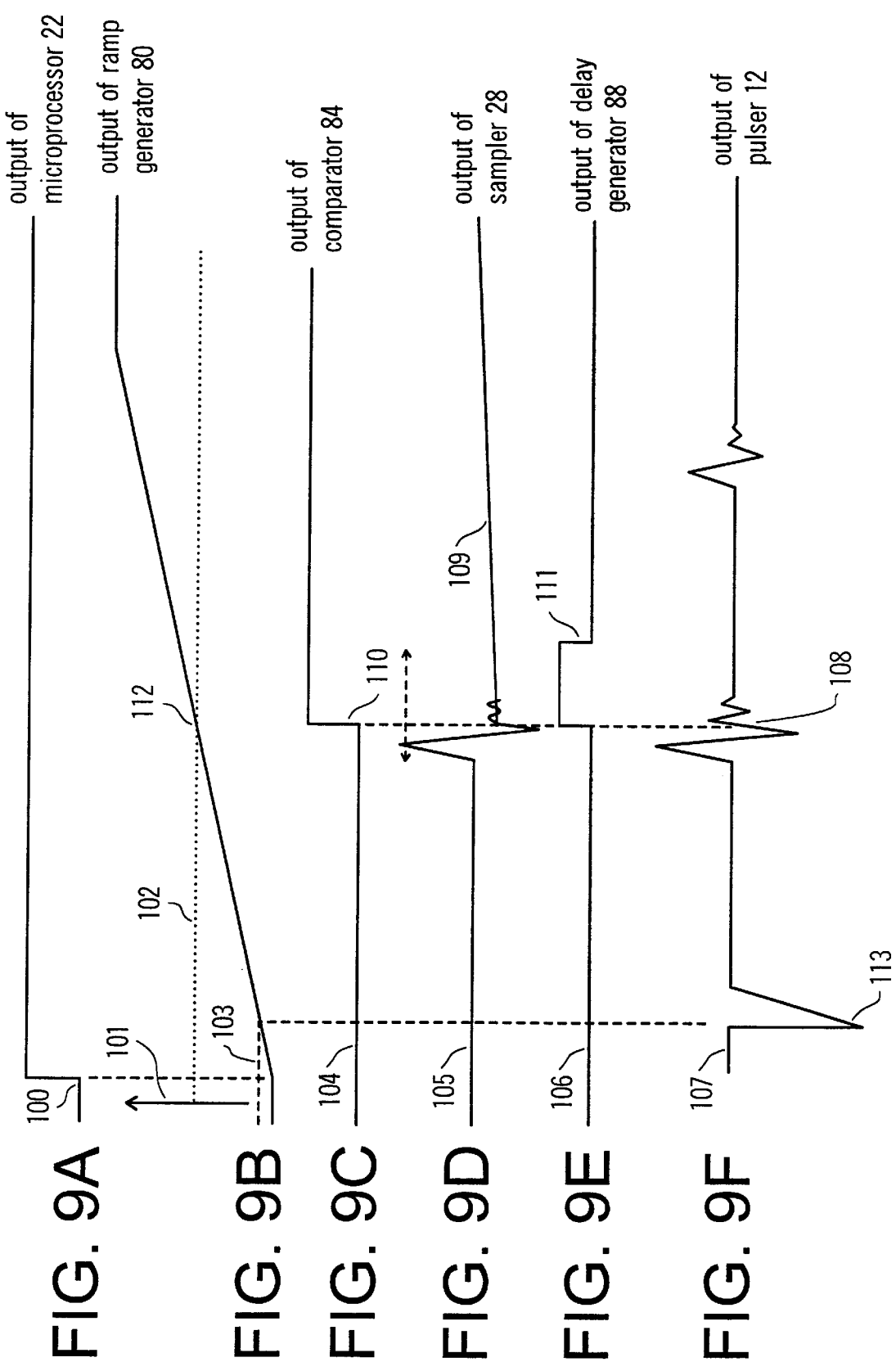
FIG. 9 is a chart illustrating signals used in the present invention.
Figure 10:
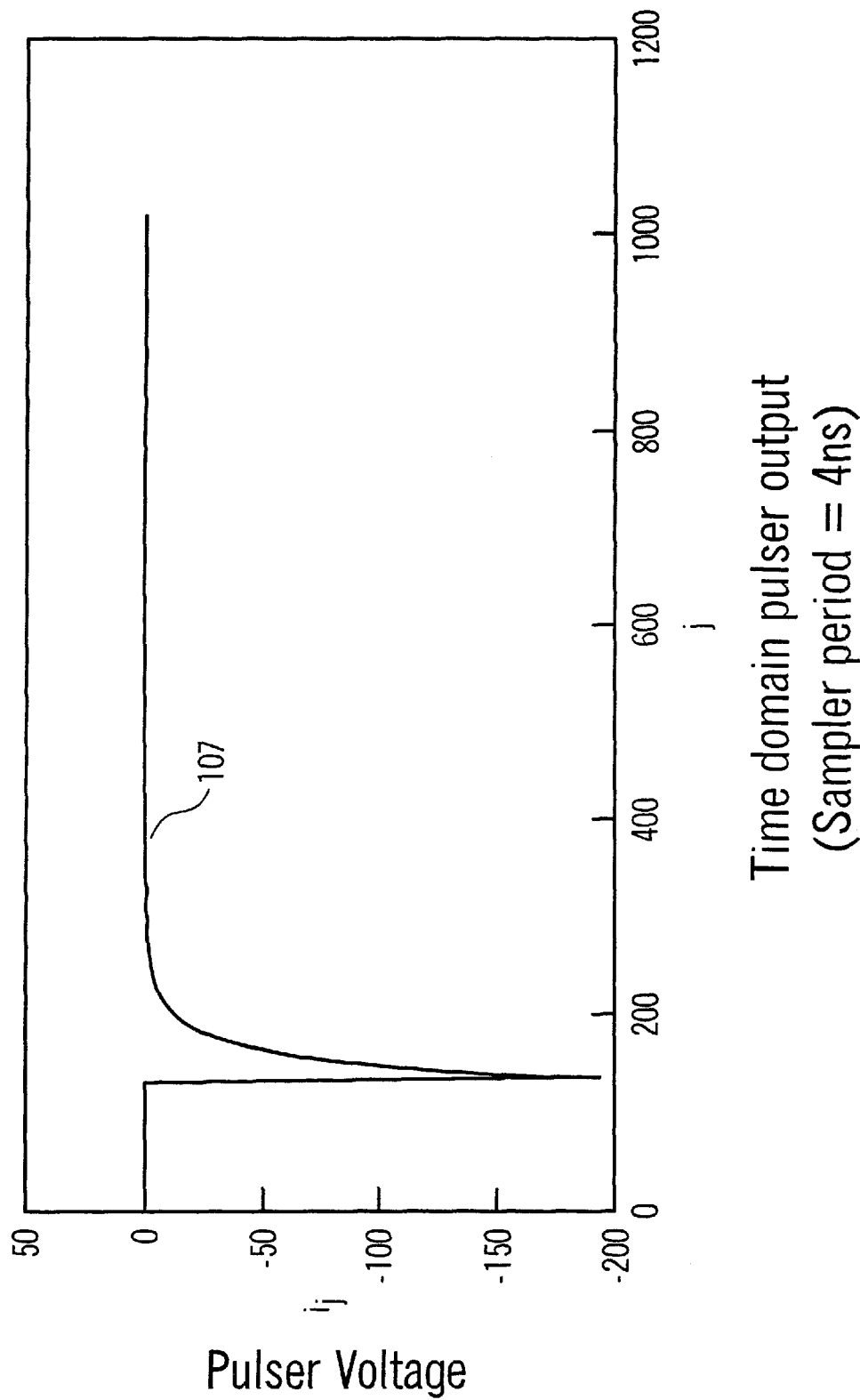
FIGS. 10 and 11 are plots representing the output of a pulser used in the present invention.
Figure 11:
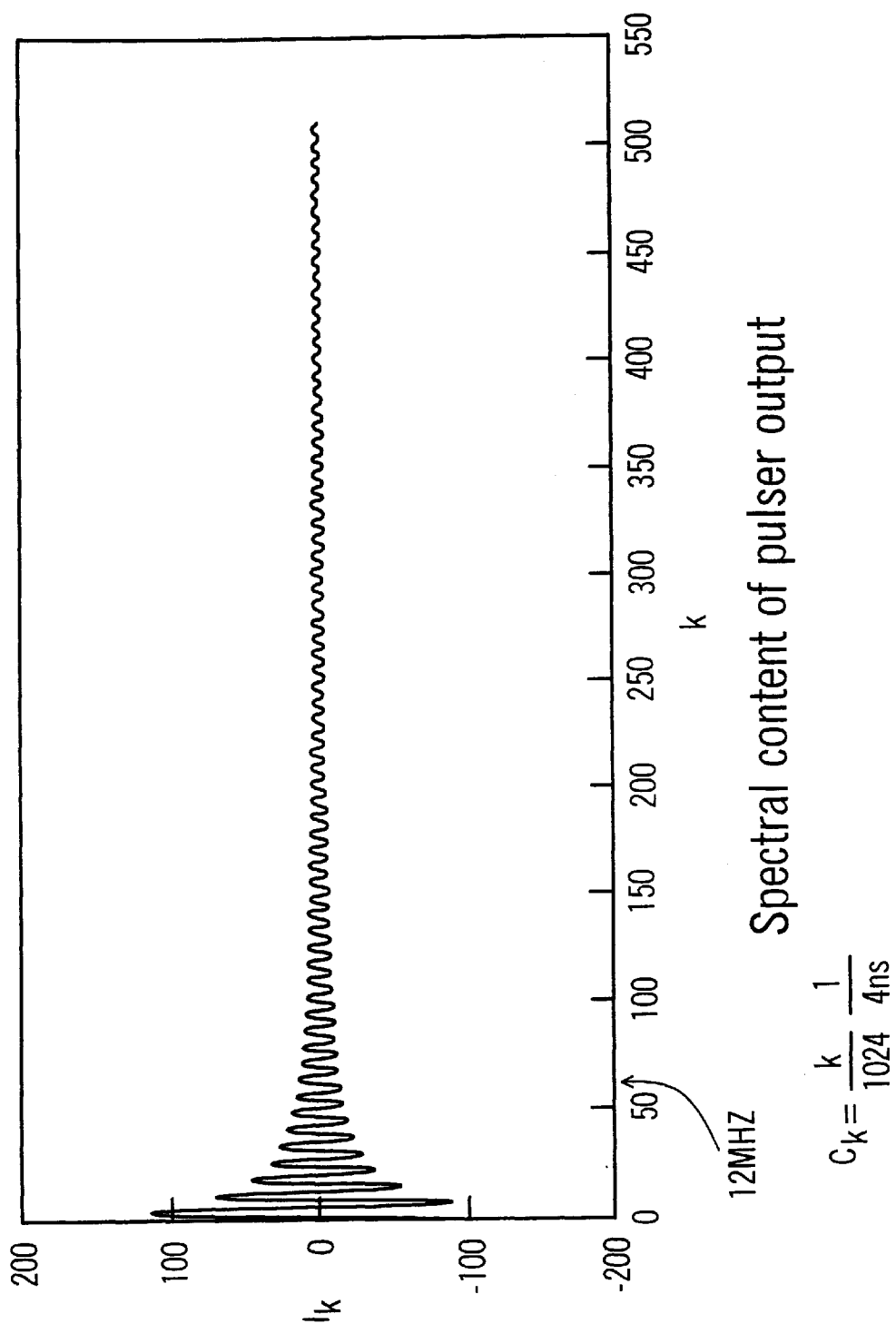

The signal 107 in the timing diagram of FIG. 9 and FIG. 10 illustrates the voltage at node B with respect to node C at the time the switch 52 is closed. The impulse closely represents an impulse function. The resonant piezo-transducer 12 connected to the pulser 24 will resonate at its fundamental frequency. FIGS. 10 and 11 represent the pulser output function in time and frequency domain, respectively.

If the transducer 12 is properly coupled to a coating, such as with the use of a gel, a vibration at the frequency of resonance will propagate into the coating. Although the above pulser 24 is disclosed, it is recognized that any suitable means of generating an impulse function will suffice.

The variable gain RF amplifier 26 preferably comprises a wide band RF amplifier that provides a gain of up to 70 dB, which has been shown to be suitable for the coating/ substrate combinations of interest for most industrial applications.

In order to vary the gain and/or the delay to compensate for different coatings and substrates, the RF amplifier 26 provides a variable gain control input. The gain of the amplifier 26 can be adjusted from 0 dB to over 70 dB.

The high speed sampler 28 is used to track the amplified echo waveform until a control signal instructs the sampler to hold the present state of the amplified echo waveform.

Figure 13:
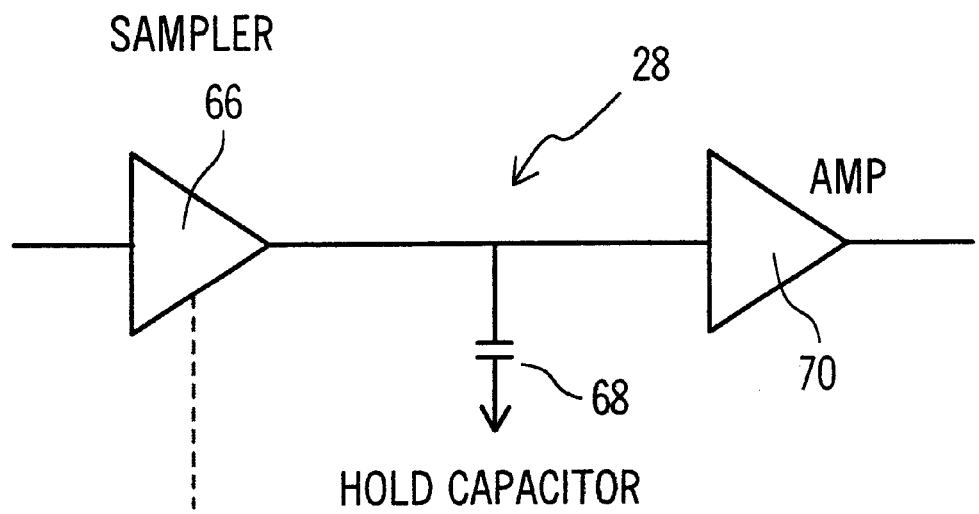
Figure 14:
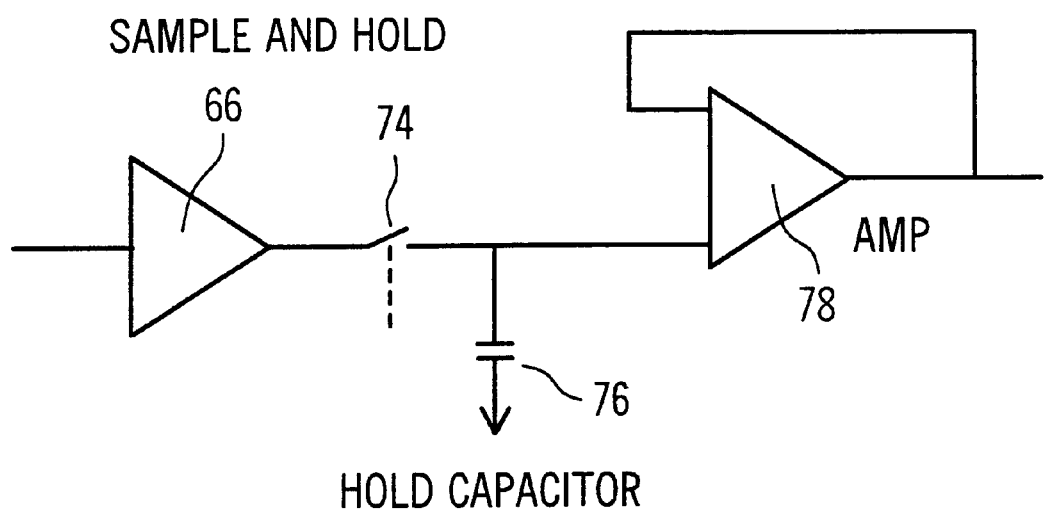

The sampler 28 of FIG. 13 includes a front end sampler that differs from traditional track and hold amplifier configurations, such as the unit 72, 74, 76, 78 of FIG. 14. The sampler 28 includes a hold switch that is incorporated into a first stage closed loop buffer 66. Conventional track and hold architectures place the hold switch 74 after the closed loop buffer 72. The sampler 28 provides error correction for both the switch and buffer while still achieving slew rates representative of an open loop design. The acquisition slew current for the hold capacitor 68 is higher than conventional diode bridge switch configurations 74,76. The acquisition current is the main contributor to the limits of maximum sampling rate, input frequency, and distortion. The closed loop output buffer 70 provides isolation of the hold capacitor from the output of the sampler.

To further improve the temporal resolution of the sampler, a low voltage input is applied to the sampler. The output of the sampler is subsequently amplified and scaled for the A/D converter. By taking special care to ensure a low noise (electrical) environment for the RF amplifier/sampler, it is possible to obtain very small acquisition times on the order of 4 nsec while maintaining a settling tolerance of 1% full scale. Since algorithms used in the present invention are not generally concerned with the absolute tolerance of the settled state of the track and hold amplifier, it is possible to further increase the temporal resolution of the sampler at the expense of amplitude tolerance. An acceptable sampler is sampler number AD9101, manufactured by ANALOG DEVICES.

The A/D converter 30 in the present invention is used to digitize the settled output of the sampler 28. The A/D converter 30 is triggered by the timing generator 32 at approximately 500 nsec after the hold signal is used to hold the present state of the input to the sampler. The timing generator 32 is used to provide a very precise time base for the timing of each pulse/echo/sample/digitize cycle.

Figure 15:
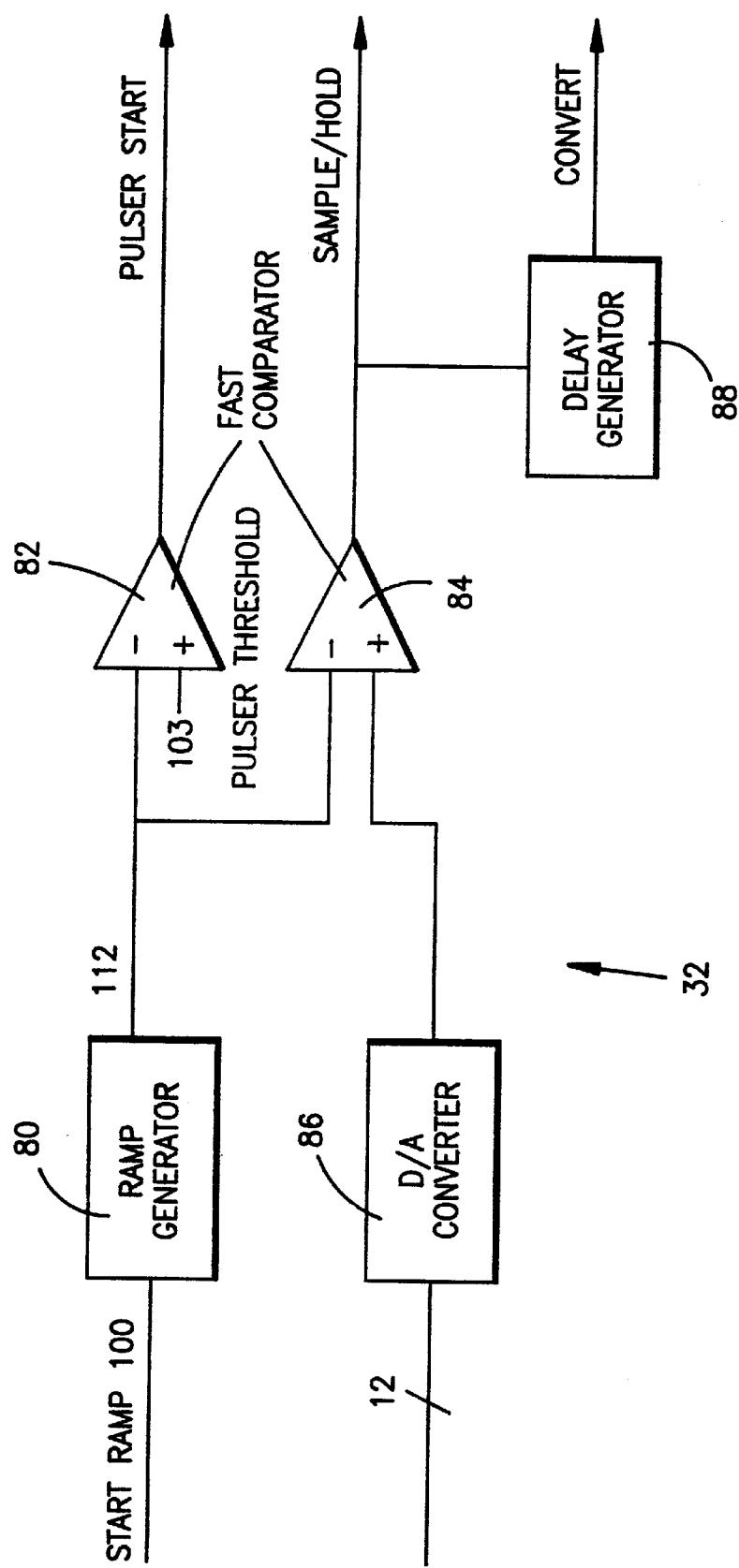

Turning attention to FIGS. 9 and 15, the timing generator 32 includes a precision ramp generator 80 that is started by a signal (100) from the microprocessor 22. The ramp waveform is illustrated in the timing diagram as (112). A fast comparator 82 compares a reference voltage (103) with the ramp signal (112). When the ramp signal (112) equals the reference voltage (103), usually at about several hundred nanoseconds after the ramp (112) has begun, the output of the comparator 82 closes the discharge switch 52 (FIG. 8) and triggers a pulse (107) from the pulser 24.

Alternatively, the pulser 24 can be triggered by the microprocessor 22 prior to triggering by the ramp. This allows the echo window to be moved in time with respect to the pulse generated from the pulser.

The comparator 84 compares the ramp signal (112) to a second reference voltage (102). The second reference voltage (102) is the output of a D/A converter 86. When the ramp signal (112) equals the second reference voltage (102), the signal (110) becomes high. The signal or delayed trigger (110) acts as the hold switch on the sampler.

By adjusting the reference voltage (102), the hold trigger can be shifted in time. Thus, in order to create a complete equivalent time sample, for each pulse of the pulser 24, the second reference voltage (102) is incremented an amount corresponding to the effective period of time between samples.

The output (105) of the sampler 28 tracks the echo waveform (108) until the delayed trigger holds the output (109) of the sampler 28. The delay generator 88 provides a hold settling delay (111) that triggers the A/D converter. The delay (111) is required to allow the signal (109) to settle prior to conversion. Since the hold circuit is not ideal, there is a droop in the held signal (109) over time. Since this droop is constant and the A/D converter 30 is triggered at the same time each cycle (111), the effect is observed on the output of the A/D converter 30 as a loss of gain.

Thus, the sampling system incorporates an equivalent time sampling method that progressively samples a small portion of the echo waveform. The pulse/echo/sample/digitize cycle is repeated while changing the input to the D/A converter. The hold switch in the sampler is thus delayed by a programmed amount each cycle. The sample period is defined as follows:

Sample period=D/A output (volts/bit)/ramp slope (volts/second)

By adjusting the slope of the ramp (112) it is possible to adjust the echo window. However, in the present invention, the ramp slope is preferably fixed, and the echo window is adjusted by changing the reference voltages (103) and (102). To measure very thick coatings an adjustable ramp or delayed ramp configuration could be used. The delayed ramp configuration triggers the pulser 24 prior to starting the ramp. Thus, the temporal resolution (sample period) of the instrument remains constant. The instrument adjusts the delay period for the start of the ramp such that the echo window overlaps the echo of interest. The output of the acquisition subsystem is a one dimensional array of numbers that represents the magnitude of ultrasonic vibrations in time as detected by the transducer 12.

The Preanalysis Subsystem

The preanalysis subsystem 16 is used to enhance the raw digitized result from the sampler 28 for use by the analysis subsystem 18. The preanalysis subsystem 16 will provide as output a one dimensional array of numbers that represents the intensity of any echoes located within the echo waveform as digitized in the acquisition subsystem 14. The preanalysis subsystem 16 is composed of three software components: a digital filter, a temporal resolution increasing algorithm and a deconvolution algorithm.

The digital filter is preferably composed of a FIR filter. The filter provides a technique to improve the signal to noise ratio of the digitized echo (compare FIGS. 6 and 7).

The temporal resolution increasing algorithm is used to improve the temporal resolution of sampled data.

The deconvolution algorithm provides a technique to reduce the signal bandwidth required by the acquisition subsystem 14 while maintaining the temporal resolution required for investigating thin coatings.

The preanalysis involves filtering (if required) and temporal enhancement (if needed). The more acoustically similar the coating is to the substrate, the more difficult it is to obtain a meaningful echo from the interface of the coating and substrate. Prefiltering will improve the signal to noise ratio and thus increase the success of the analyzer. In addition, coarse materials used as coatings result in echo waveforms that have many echo paths.

Figure 7:
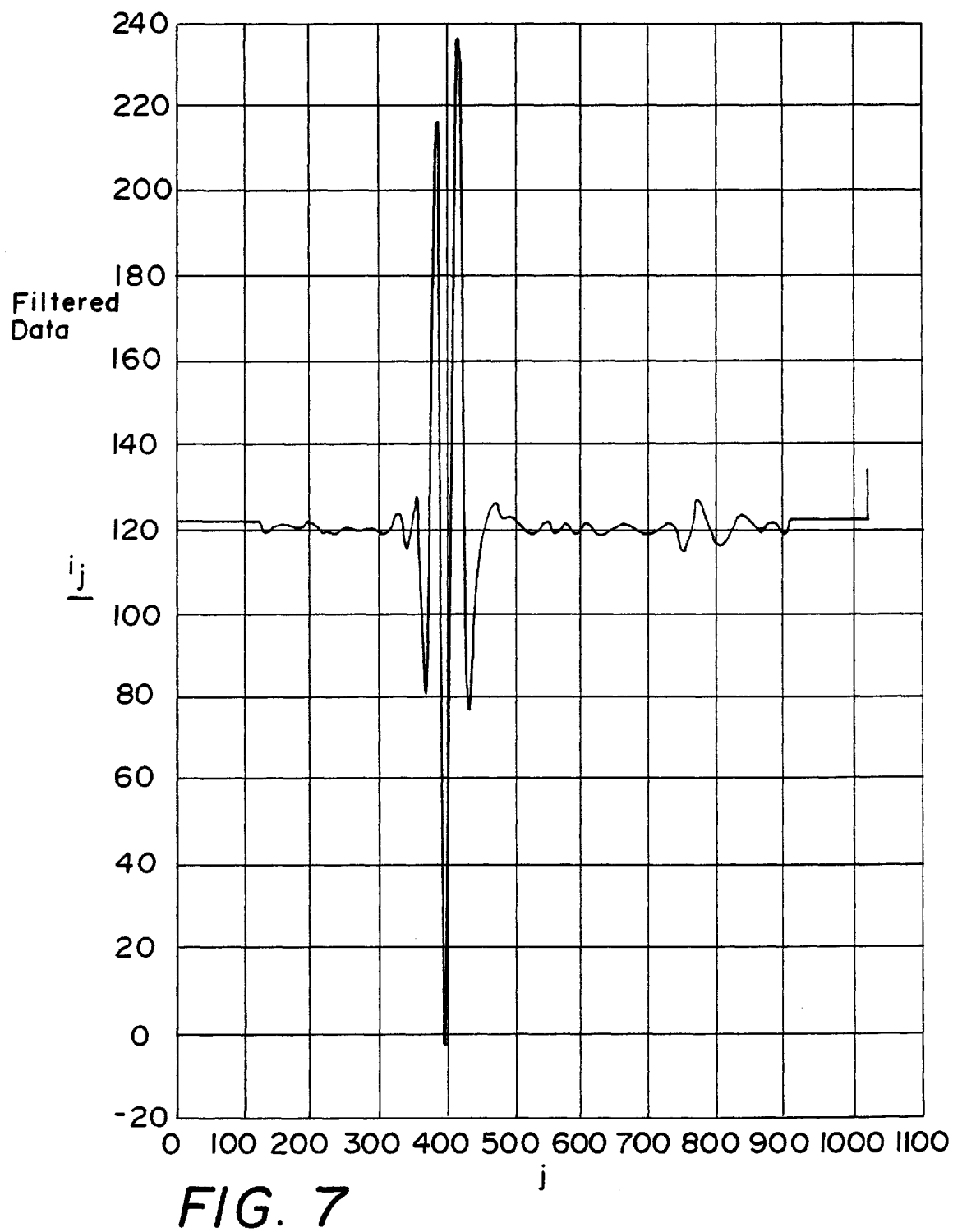

The strengths of a digitized echo waveform become apparent when the echo waveforms are not well defined, as illustrated in FIG. 6 (unfiltered) and FIG. 7 (filtered). Digital filtering techniques enable the construction of very well defined/behaved filters.

In some inspection configurations no filtering is required to analyze the echo waveform. The preanalyzer determines the necessity of filtering and the type of filter to use based on the configuration of the gauge and the type of transducer being used. The filter type can be easily adjusted by simple selection of a different program branch.

If the coating is thin, situations may occur wherein the echo obtained from a coating/substrate interface interferes with the echo obtained from the transducer/coating interface. In such situations, deconvolution can be used to assist in obtaining time domain reflection characteristics of the coating.

Figure 16:
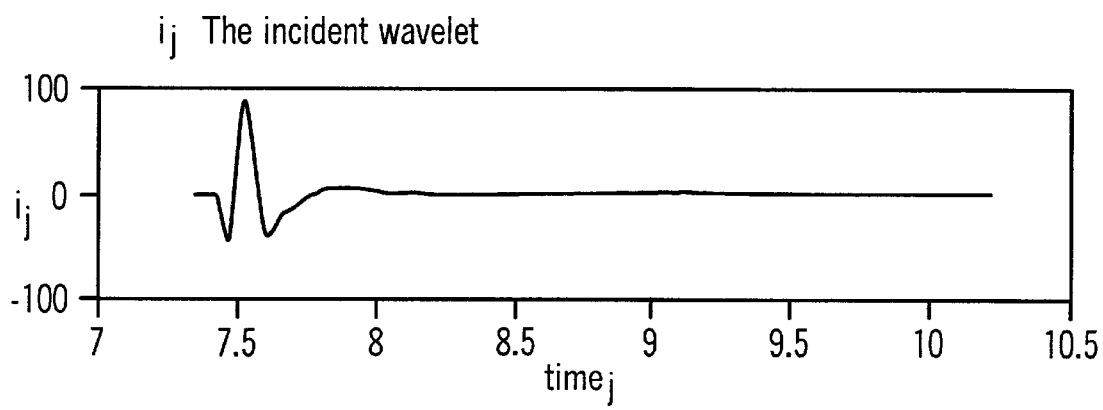
FIGS. 16–20 represent signal plots used in the present invention.
Figure 17:
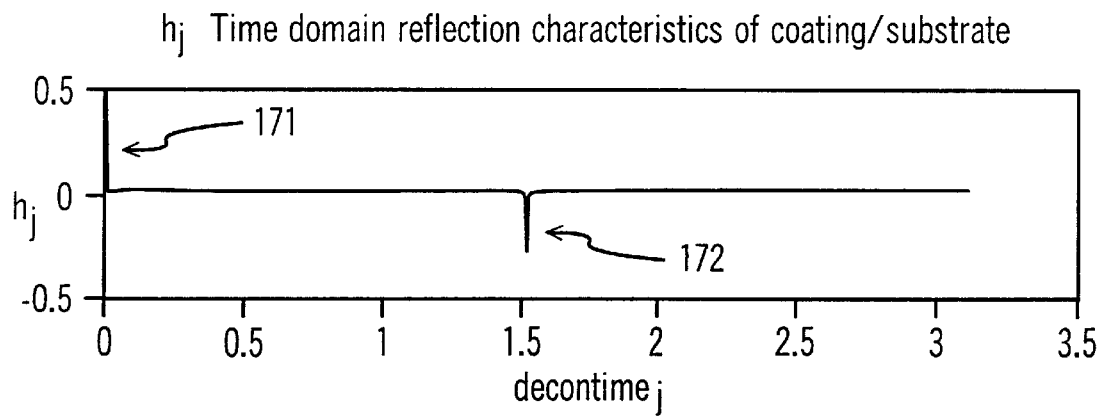
Figure 18:
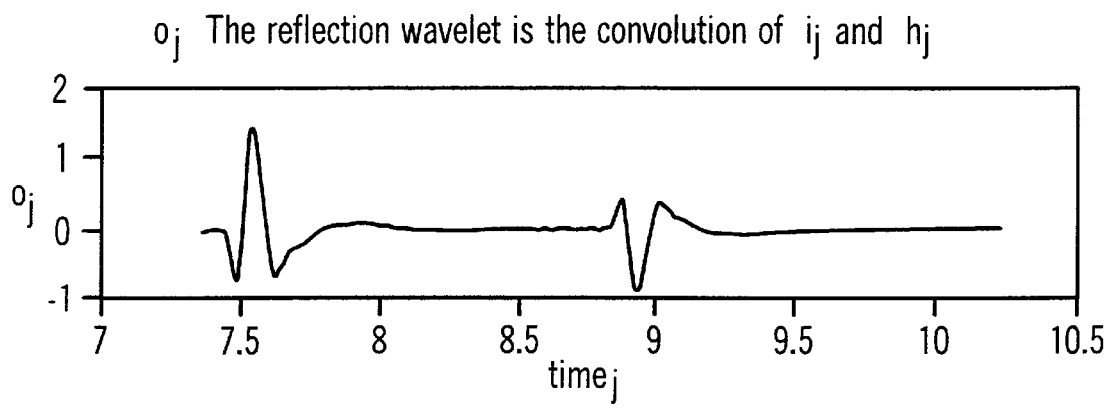

The following analysis illustrates how deconvolution can be used in a coating thickness gauge. Assume that the propagation of ultrasonic vibrations and the reflection of those vibrations from acoustic boundaries is a linear process. If given the incident wavelet $i_j$ (FIG. 16) and the time domain reflection characteristics $h_j$ (FIG. 17) of the delay line/coating and coating/substrate system, it would be possible to derive the reflection wavelet $o_j$ (FIG. 18) by using convolution. The time domain reflection characteristics ($h_j$) can be thought of as an xy plot where the x axis represents propagation time, with respect to the incident wavelet, of the ultrasonic vibration and the y axis represents the intensity of reflections from boundary layers as described earlier. Peak 171 on FIG. 17 represents the delay line/coating echo. Note that this echo is located at time 0. Peak 172 represents the coating/substrate echo. Note that this echo is located at time 1.5 μsec. This indicates that the round trip time for the portion of ultrasonic vibration that reflects from coating/substrate boundary is 1.5 μsec.

An echo obtained from the delay line of the transducer can be used to represent the incident wavelet $i_j$. It is possible to digitize the reflection wavelet $o_j$. Given the digitized representations for both the incident and reflection wavelets ($i_j$ and $o_j$), it is possible, by using deconvolution, to obtain the time domain reflection characteristics $h_j$ of the coating/substrate. From the time domain reflection characteristics $h_j$, the round trip time for the ultrasonic vibration can be determined, which can be used to determine the thickness of the coating. In the present invention, frequency domain deconvolution is practiced using inverse fast Fourier transforms (ifft) and fast Fourier transforms (fft):

$$h_j = \text{ifft}(\text{fft}(o_j)/\text{fft}(i_j))$$

where the deconvolution can be calculated as a point by point division in the frequency domain of the reflection wavelet and the incident wavelet.

In operation the gauge 10 is calibrated by sampling an ultrasonic reflection from the delay line of the transducer ($i_j$). The reflection wavelet ($o_j$) is the sampled echo waveform as described. $h_j$ is calculated, as set forth above.

Conventionally, different transducer frequencies are preferred for different combinations of coating and substrate materials and thickness ranges. Using a broad band transducer and deconvolution the present invention can be used to measure a wide variety of coating and substrate combinations and thickness ranges with a single transducer. One advantage of the present invention is that the system may be adjusted to avoid having to change the frequency of the transducer to measure thin coatings.

The following example will demonstrate the use of deconvolution to limit the frequency bandwidth requirements of the acquisition subsystem. The coating to be measured is 1 mil epoxy on a plastic substrate. The longitudinal velocity in the epoxy coating is 105 mils/microsecond. An ultrasonic vibration reflected from the epoxy/plastic interface will arrive at the transducer within about 20 nsec. After being produced by the transducer.

(2*1 mil)/(105 mils/microsecond)=19.05 nsec.

The wavelength of the vibration within the delay line for a 10 MHz resonant transducer is calculated as follows:

$1/10*10^6$ Hz=100 nsec.

Figure 23:
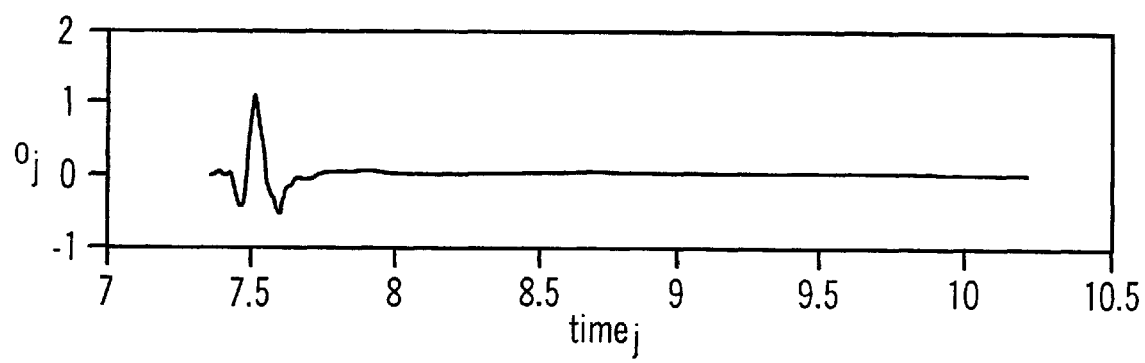
FIGS. 23 and 24 represent signal plots used in the present invention.
Figure 24:
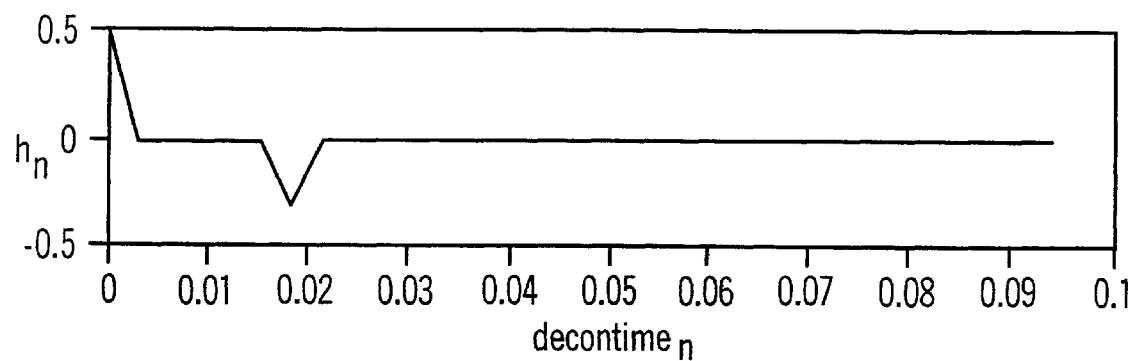

Thus the echo from the delay line/coating interface will overlap with the echo from the epoxy/plastic interface. The result of such an overlap is illustrated in FIG. 23. Using conventional ultrasonic inspection techniques, the reflection wavelet of FIG. 23 would not provide an indication of coating/substrate interface directly. However, using deconvolution, the result of FIG. 24 is obtained. FIG. 24 illustrates an echo at time 0 (the delay line and coating interface) and an echo at 0.019 microseconds (19 nsec).

Without using the principles of the present invention, the above sample could be analyzed directly using a high frequency (low wave length), highly damped (low ring) transducer. Such a transducer would have to have a resonant frequency of at least 75 MHz to ensure that the delay line/coating echo passed before the coating/substrate echo arrived.

It should be recognized that other algorithms could be used in place of deconvolution. Cepstral domain processing, split spectrum deconvolution, and weiner deconvolution are just a few. The present invention preferably uses a temporal resolution increasing algorithm to reduce the bandwidth requirements of the acquisition system.

The output of the preanalysis subsystem 16 will preferably be a time domain representation of the reflection character of the investigation denoted $h_j$.

To enhance the temporal resolution of the echo waveform obtained from the acquisition subsystem, a fitting algorithm can be employed to fit the digitized waveform. The fitted waveform is then sampled in software at the desired resolution. The new waveform represents with error the original sampled echo.

Figure 20:
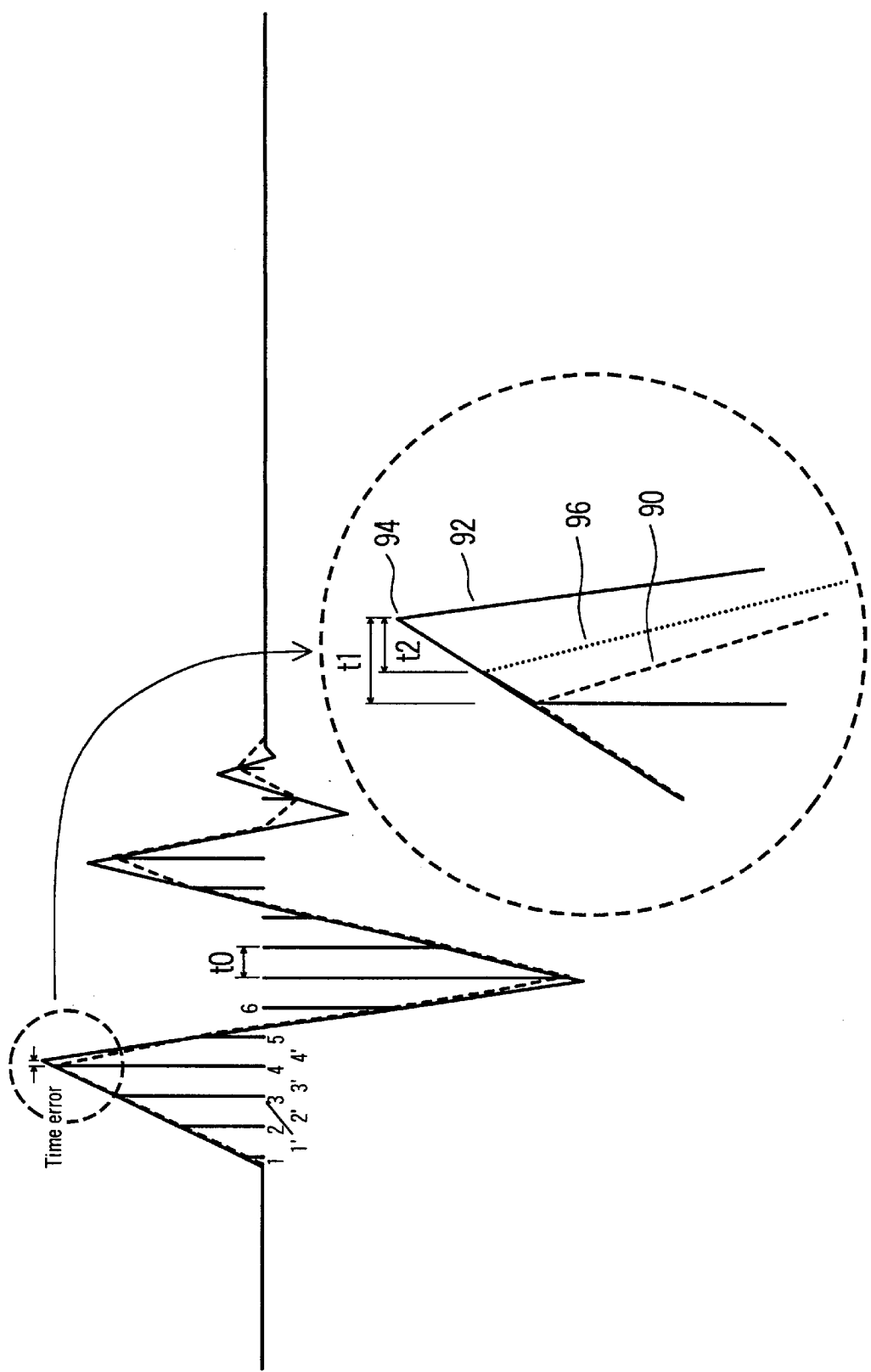

For example, turning attention to FIG. 20, the dashed line 90 represents the waveform as sampled. However, the actual waveform 92 may include a peak 94 at a point in time $t_1$ beyond the measured peak that is between two samples 5 and 6. Using a fitting algorithm, a fitted waveform 96 may be created that more closely approximates the actual waveform 92 than the measured waveform 90. If the new waveform 96 is then sampled at 1, 1', 2, 2', 3, 3', etc., a digitized representation of the waveform 96 can be constructed with twice the temporal resolution of the original signal 90. The temporal resolution enhancement algorithm is preferably used by the present invention when high resolution thickness measurements are required.

Figure 19:
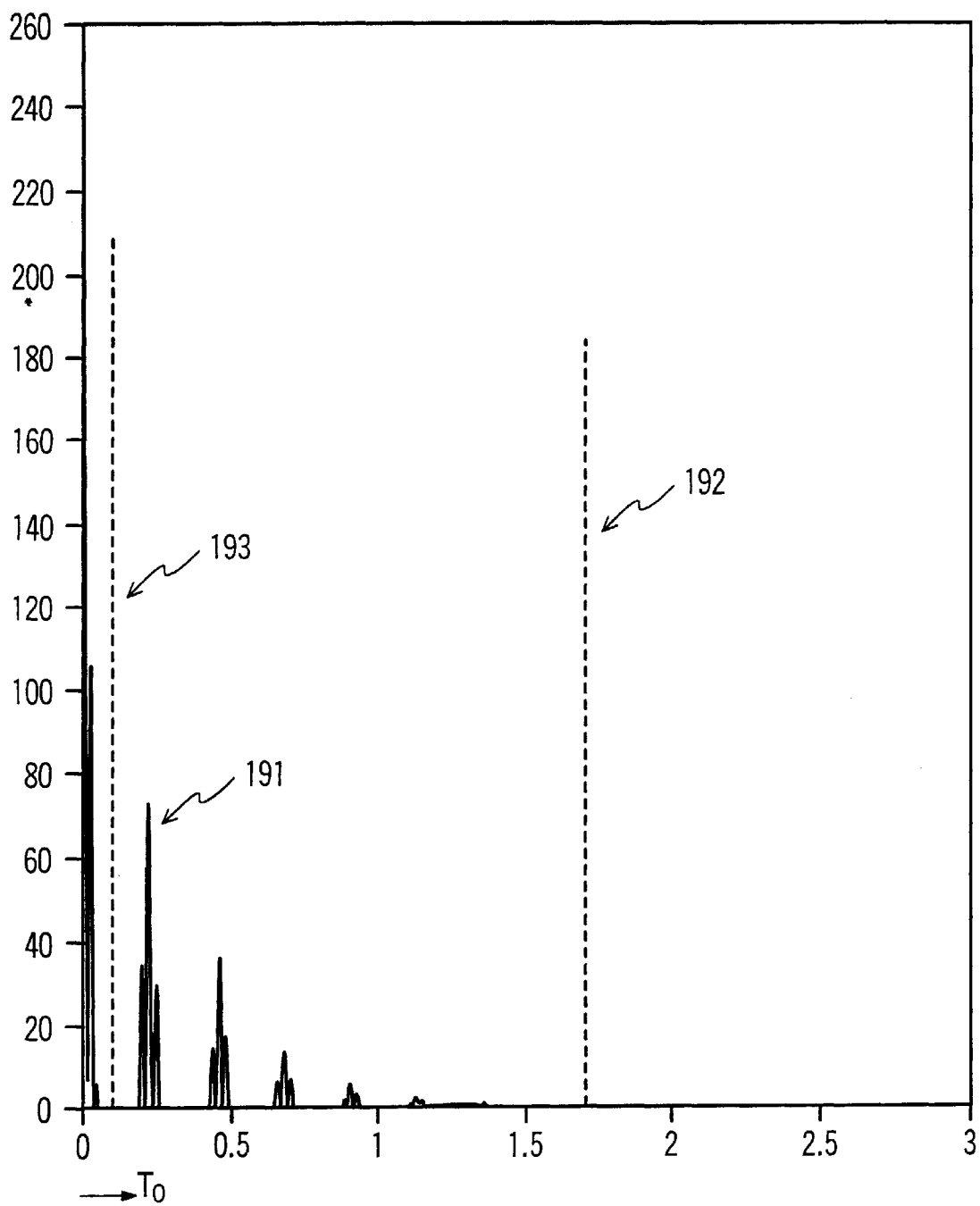

The Analysis Subsystem:

The analysis subsystem 18 is composed of a peak detector, and a thickness converter. The analysis subsystem 18 is used to locate the boundary echo within the time domain reflection character as calculated by the preanalyzer. FIG. 19 illustrates an example plot of the output from the preanalysis subsystem 16. This plot has, as the x axis, time with respect to the signal 113 in FIG. 9 minus the round trip time of the delay line/coating echo. The result obtained from the analysis subsystem 18 is a measure of the coating thickness.

Since the result of the preanalysis subsystem 16 is a time domain representation of the intensity of echoes within the echo window, and the intensity of the echo obtained from a coating/substrate boundary will in all likelihood be the largest within the reflection character (assuming the gain control is configured properly) the peak detector has been designed to find the maximum peak within a defined region of the reflection character.

The defined region is determined given prior knowledge of the coating/substrate combination. The prior knowledge is obtained by configuration and calibration. Some coating/substrate combinations will provide surface echoes due to rough surface conditions, as well as subsurface echoes due to coating scatter and substrate surface roughness. Accordingly, the peak detector uses gates 193 and 192 to control where to look for peaks in the reflection character. The position of the gates within the reflection character define the region where the peak detector is to operate. The low gate 193 and high gate 192 are set by converting low range and high range settings that are input by an operator.

The low gate 193 is defined such that the peak detector will only analyze points beyond the low gate 193. The high gate 192 is defined such that the peak detector will only analyze points prior to the high gate 192.

The result of the deconvolution is a time domain reflection character as illustrated in FIG. 19. The x axis of the reflection character is time measured with respect to the incident wavelet. The incident wavelet represents the echo from the delay line/coating interface. Thus, the time on the x axis of the reflection character is the time of propagation beyond the delay line. The propagation time of the ultrasonic vibration from the delay line to the coating/substrate boundary and back to the delay line can be measured from the largest peak 191 within the gated reflection character. This time is denoted as $T_0$ (FIG. 19).

Thickness of the coating can then be derived if the acoustic velocity is known for the mode of propagation by means described earlier. If multiple echoes are obtained, it is possible to instruct the instrument to detect the location of the multiple echoes. Such multiple echoes may be present in the analysis of laminated structures.

The Configuration Subsystem

The configuration subsystem 20 is used to configure the instrument given a selection for coating and substrate as supplied by the operator. These material selections are converted by the configuration subsystem 20 into configuration parameters for the other subsystems illustrated in FIG. 2. The configuration subsystem 20 is composed of five software components: gain configuration, echo window configuration, impulse response storage (incident wavelet), material tables configuration, and calibration control.

Figure 21:
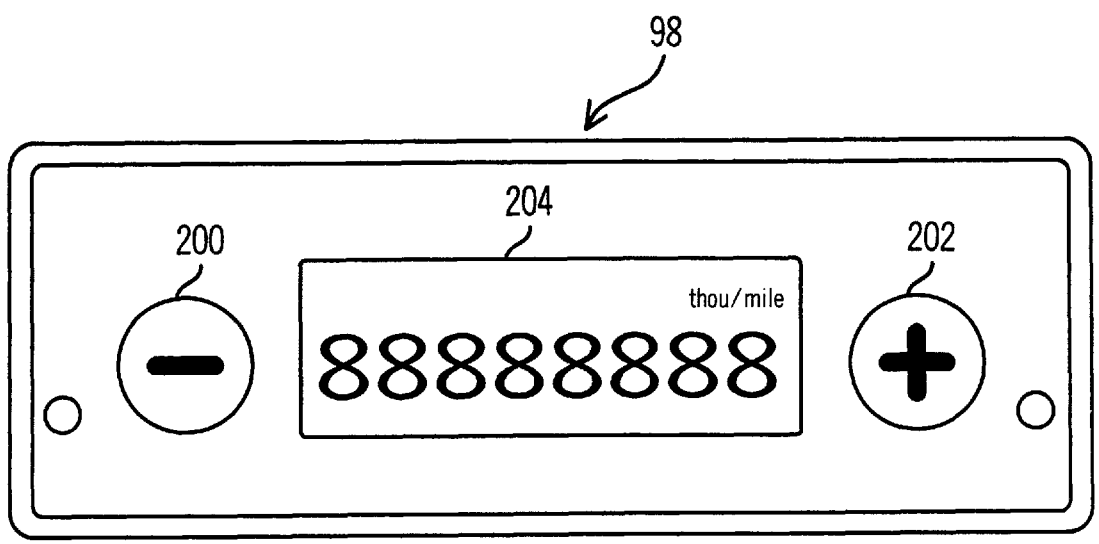
FIG. 21 illustrates a user interface panel according to the present invention.

FIG. 21 illustrates an operator interface 98 for the gauge 10 of FIG. 1. The unique design of the instrument allows the operation of the gauge 10 to be controlled by a combination of two keys 200, 202 labelled "−" and "+", and an LCD panel 204 capable of displaying alphanumerics.

All gauge field operations are controlled by the activation of the − and + keys 200, 202. Sophisticated gauging operations can be accessed via an integrated serial interface 221 (FIG. 22) to a host computer.

In the power off state, the gauge 10 is activated by depressing the button 42 on the transducer, or either of keys 200, 202. Once powered, the gauge 10 resumes the operation that it was last performing when it was powered down. Typically, the gauge 10 will be configured for a particular inspection.

When the transducer 12 is engaged on a coating, the gauge 10 will acquire echo waveforms and perform the required processing/analysis to derive a measurement. If no measurement can be obtained, appropriate error indications are presented to the operator on the LCD panel 204.

To change the operational characteristics of the gauge 10, the operator selects a menu operation by simply activating both keys 200, 202 simultaneously. Menu option 1 will be displayed on the LCD panel 204. To activate this option depress the + key 202, which functions as the "YES" key. To move on to the next available menu option, depress the − key 200, the "NO" key. If no more options are available the gauge falls out of the menu mode and continues as if the menu were not invoked. The use of two keys allows the operator to select any option and instruct the gauge.

Example: One option of the menu mode enables the operator to set the coating material. When entering that option the display may read "COATING?" If the operator responds with the yes key 202, the screen displays the first of several materials likely to be found as a coating. The operator scrolls through the different materials by depressing the no key 200 if the displayed material is not the coating material. When the coating material to be investigated is displayed, the operator presses the yes key 202, signalling the microprocessor 22 to adjust the system parameters for the selected coating material.

Another menu option allows the operator to select the substrate material in the same manner in which the coating material is selected.

When the appropriate coating and substrate materials have been selected, the microprocessor 22 selects or calculates an appropriate gain for the amplifier 26, and selects an appropriate gate for the detection of an echo from an interface between the selected coating/substrate materials. The selection or calculation of the appropriate gain and gate are made through a suitable memory or programmed function.

The menu may also request the operator to identify an expected range, or at least an expected minimum value for the thickness of the coating. That range data can also be used for purposes of calculating appropriate gates. See FIG. 19.

The microprocessor 22 can be programmed so that when a category in the menu is brought up, the selectable items for each menu option are displayed in the order of most frequent use. For example, if the coating most frequently selected is PAINT, then when the COATING? option is activated, the first option to be displayed will be PAINT. If PAINT is not selected, the second most frequently selected option will be displayed next, etc.

Alternatively, the system can be set up so that the items can be displayed in any other order, such as in alphabetical order.

Accordingly, using the various criteria selected by the user, the system calibrates itself so that the measurements are as quick and accurate as possible. The primary calibrations made are the adjustment of the gain of the amplifier 26 and the setting of the gate.

The following analysis illustrates how the intensity of an echo can be calculated given certain properties of the coating and substrate:

Given:

$\sigma$ density in $$\frac{Kg}{m^3}$$

$\mu$ Poissons ratio

E Modulus of elasticity in $$\frac{N}{m^2},$$

then $$C_1 = \sqrt{\frac{E(1-\mu)}{\sigma(1+\mu)(1-2\mu)}}$$

(Longitudinal velocity), and $Z = \sigma \cdot C_1$ (acoustic impedance).

If the properties of the coating and substrate are provided, the acoustic impedance of the coating and substrate can be calculated:

$$Z_{coating} = \sigma_{coating} \cdot C_1 \text{ coating}$$

$$Z_{substrate} = \sigma_{substrate} \cdot C_1 \text{ substrate}$$

The intensity of a reflection from the boundary layer of the coating and substrate is defined as:

$$J_R = J \cdot R$$

Where $$J = \frac{1}{2} \cdot Z_{coating} \cdot \omega^2 \cdot \zeta^2$$

(intensity of the incident vibration)

$$R = \left(\frac{Z_{substrate} - Z_{coating}}{Z_{substrate} + Z_{coating}}\right)^2$$

$\omega$=angular frequency of vibration in $\frac{rad}{sec}$, and
$\zeta$=vibrational displacement in meters.

Using the attenuation law for intensity and the properties for plane wave reflection/transmission, the following derivation illustrates how the gage can calculate the gain vs delay function for a given coating/substrate combination as selected from the menu.

The resistance a material exhibits to the propagation of an ultrasonic vibration is referred to as the attenuation constant. Different coatings will exhibit different attenuation constants.

$I = I_o e^{-ad}$ where
  I=intensity at distance d.
  $I_o$=intensity at distance 0.
  a=attenuation constant nepers/distance.
therefore
  ad=10 $\log_{10}(I_o/I)$dB
  where
    a=attenuation in dB/distance.
Given $I_o$, a, and d, then I can be calculated to be:

$I = 10^{-(ad/10)}$.

D is defined as $D = (4Z_1 Z_2)/(Z_1+Z_2)^2$, which is the intensity of the transmitted portion of the incident vibration from a boundary between material 1 and 2.
Defining:
  $R_0$=intensity of the reflection from delay line/coating (R as defined earlier)
  $D_0$=intensity of the transmitted portion from the delay line/coating
  $R_1$=intensity of the reflection from the coating/substrate, we can thus derive the intensity of an echo for an arbitrary coating thickness d by:

$I_o = R_o$, and $I_d = D_0^2 10^{-(ad/10)} R_1 10^{-(ad/10)}$.

Using this relation, it is possible to calculate the gain vs delay to effect an ultrasonic inspection given the attenuation constant of the coating, the delay line material, the coating material and substrate matter.

The gain required is: $G_d = G_{delay\ line} + 10\ \log(1/I_d)$, where $G_{delay\ line}$=gain required to obtain an acceptable delay line only ($I_j$) echo. By selecting an appropriate small step size for d, it is possible to construct a gain vs distance plot. The present invention performs just such an analysis when configuration is being performed.

As explained above, the gain is initially set by determining a gain vs delay function, which is a factor of the acoustic impedance of the coating and base materials. Thus, by using the menu options, the acoustic impedance of the coating and substrate can be used to calculate the appropriate gain.

In a similar manner, the reading of the system can be further calibrated using the + and − keys 202, 200. To calibrate the system, a reading is made on a coating of a known material and thickness. If the displayed reading is not exactly the thickness of the coating, the displayed reading can be changed using the + and − keys 202, 200 until the displayed value equals the known thickness of the coating. Changing the displayed value using the + and − keys adjusts the value used to represent velocity of the ultrasound in the coating. Thus, the gain vs delay function can be recalculated. The changes to the gain vs delay function are "locked" until the system is reset again, either by the + and − keys, or by some function on the menu.

Overall Ergonomic Design

The location of the keys are placed such that one handed operation of keys is possible. The pressure required to activate the keys is chosen such that accidental operation is minimized but operation remains simple. No bias is presented to the operator in terms of left/right handed operation.

As can be seen in FIG. 22, the gauge 10 has a replaceable battery pack 204 to allow for convenient replacement of the power source while on an inspection. The gauge 10 also includes a left hand strap 206 and a right hand strap 208 so that the gauge 10 can be conveniently used by both left and right handed operators. The gauge 10 also includes a cover flap 210 that can be held in place with releasable snaps to protect elements on the gauge 10.

At the back side of the gauge 10, the lead wire from the transducer is attachable by means of a jack (212). The plug on the coax cable 58 that connects the transducer to the gauge is designed such that the wire runs parallel to the back side of the case. It does not project perpendicularly from the case.

In addition, the case also includes an RS 232 port (221) so that the gauge can be connected to a computer. Using the RS232 port, measurements can be taken while the system is connected to a computer so that the measurements can be analyzed or displayed in real time. Alternatively, measurements can be stored in a memory in the gauge 10 so that after returning from taking measurements, an operator can download the stored data from the memory into a computer for more detailed analysis by the computer. Both the actual waveforms, as well as the thickness reading can be stored in accordance with techniques well known to those of ordinary skill in the art.

The pouch design for the gauge 10 incorporates a strap 214 that functions as a shoulder strap. The pouch further includes straps 208 and 206 that can be used by either a left hand or a right hand for convenient carrying of the gauge 10.

The pouch is illustrated in FIGS. 1 and 22. In field operations it is necessary to provide a simple means of replacing batteries. The pouch design of the present invention incorporates a battery compartment 204 that forms an integral aspect of the design. Battery replacement is accomplished by removing the integral battery pack from the pouch (not each individual battery) and replacing the battery pack with a fresh pack. Incorporated into the pouch is an envelope to store gauge operational instructions. The pouch also includes a flap 210 that can be used to cover the front face of the gauge 10 that includes the visual display and the + and − keys.

Attached to the strap 212 is a vinyl pouch 216 that having a slit type opening. The vinyl pouch 216 is provided to hold the transducer 12 when not in use. The vinyl pouch 216 is particularly useful because it is not harmed by the gel necessary to use at the end of the transducer. The pouch 216 also prevents the gel from getting on the operator's clothing or hands.

FIGS. 25 and 26 illustrate additional views of the gauge. Although only preferred embodiments are specifically illustrated and described herein, it will be appreciated that many modifications and variations of the present invention are possible in light of the above teachings and within the purview of the appended claims without departing from the spirit and intended scope of the invention.

What we claim is:

1. A gauge for determining a thickness of a coating on a substrate, comprising:

a transducer for emitting and receiving ultrasonic signals into the coating and for generating electrical transducer signals proportional to the ultrasonic signals received by said transducer, said received signals include first signals reflected from a transducer/coating interface and second signals reflected from a coating/substrate interface;

a pulser for sending pulses to the transducer to trigger the emission of said ultrasonic signals;

a sampler for sampling the electrical transducer signals and generating sampled data;

control means for calculating a thickness of the coating based on said sampled data, said control means includes means for subjecting said sampled data to a deconvolution analysis so as to distinguish sampled data corresponding to said first signals from sampled data corresponding to said second signals.

2. The gauge of claim 1, wherein the transducer is a 10 Mhz transducer.

3. The gauge of claim 1, wherein the deconvolution analysis includes deconvolving an incident waveform signal with a reflection waveform signal to obtain time domain reflection characteristics of the reflection waveform.

4. The gauge of claim 3, wherein the deconvolution analysis uses frequency domain deconvolution using inverse fast Fourier transforms (ifft) and fast Fourier transforms (fft).

5. The gauge of claim 3, wherein the time domain reflection characteristics of the reflected waveform are obtained by finding the inverse fourier transform of the fourier transform of the reflection waveform signal divided by the fourier transform of the incident waveform signal.

6. The gauge of claim 3, wherein the time domain reflection characteristics represent interfaces between the coating and the substrate.

7. The gauge of claim 6, wherein the interface between the coating and the substrate is determined by performing a peak detection analysis of the time domain reflection characteristics of the reflection waveform.

8. The gauge of claim 3, wherein the incident waveform is a reflection from the transducer/coating interface.

9. The gauge of claim 1, wherein said second signals include signals reflected from a plurality of coating interfaces.

10. A gauge for determining a thickness of a coating on a substrate, comprising:

a transducer for emitting and receiving ultrasonic signals into the coating and for generating electrical transducer signals proportional to the ultrasonic signals received by said transducer, said received signals include first signals reflected from a transducer interface and second signals reflected from a coating/substrate interface;

a pulser for sending pulses to the transducer to trigger the emission of said ultrasonic signals;

a sampler for sampling the electrical transducer signals and generating sampled data;

control means for calculating a thickness of the coating based on said sampled data, said control means includes means for subjecting said sampled data to a deconvolution analysis so as to distinguish sampled data corresponding to said first signals from sampled data corresponding to said second signals.

11. The gauge of claim 10, wherein the deconvolution analysis includes deconvolving an incident waveform signal with a reflection waveform signal to obtain time domain reflection characteristics of the reflection waveform.

12. The gauge of claim 11, wherein the deconvolution analysis uses frequency domain deconvolution using inverse fast Fourier transforms (ifft) and fast Fourier transforms (fft).

13. The gauge of claim 11, wherein the time domain reflection characteristics of the reflected waveform are obtained by finding the inverse fourier transform of the fourier transform of the reflection waveform signal divided by the fourier transform of the incident waveform signal.

14. The gauge of claim 11, wherein the time domain reflection characteristics represent interfaces between the coating and the substrate.

15. The gauge of claim 11, wherein the interface between the coating and the substrate is determined by performing a peak detection analysis of the time domain reflection characteristics of the reflection waveform.

16. The gauge of claim 11, wherein the incident waveform is a reflection from the transducer interface.

17. The gauge of claim 10, wherein said second signals include signals reflected from a plurality of coating interfaces.

* * * * *